US008750681B2

(12) United States Patent
Oryoji et al.

(10) Patent No.: US 8,750,681 B2
(45) Date of Patent: Jun. 10, 2014

(54) ELECTRONIC APPARATUS, CONTENT RECOMMENDATION METHOD, AND PROGRAM THEREFOR

(75) Inventors: Hiroshi Oryoji, Kanagawa (JP); Koji Kashima, Kanagawa (JP); Tatsumi Sakaguchi, Kanagawa (JP); Masashi Eshima, Tokyo (JP)

(73) Assignee: Sony Corporation, Tokyo (JP)

( * ) Notice: Subject to any disclaimer, the term of this patent is extended or adjusted under 35 U.S.C. 154(b) by 364 days.

(21) Appl. No.: 13/038,808

(22) Filed: Mar. 2, 2011

(65) Prior Publication Data

US 2011/0243529 A1 Oct. 6, 2011

(30) Foreign Application Priority Data

Mar. 31, 2010 (JP) .................................. 2010-084667

(51) Int. Cl.
*H04N 9/80* (2006.01)

(52) U.S. Cl.
USPC .......................................... 386/248; 386/331

(58) Field of Classification Search
USPC ................................................ 386/248, 331
See application file for complete search history.

(56) References Cited

U.S. PATENT DOCUMENTS

| 7,185,283 | B1 * | 2/2007 | Takahashi ...................... 715/723 |
| 2005/0276571 | A1 * | 12/2005 | Miyajima et al. ............... 386/46 |
| 2007/0288964 | A1 * | 12/2007 | Horiguchi ....................... 725/46 |

OTHER PUBLICATIONS

Gal Lavee, et al., "Understanding Video Events: A Survey of Methods for Automatic Interpretation of Semantic Occurrences in Video", IEEE Transactions on Systems, Man, and Cybernetics—Part C: Applications and Reviews, vol. 39, No. 5, Sep. 2009, pp. 1-64.
"YouTube", <URL:http://www.youtube.com>.
Lexing Xie, et al., "Event Mining in Multimedia Streams: Research on identifying and analyzing events and activities in media collections had led to new technologies and systems", Proceedings of the IEEE, vol. 96, No. 4, Apr. 2008, pp. 623-647.

* cited by examiner

*Primary Examiner* — Thai Tran
*Assistant Examiner* — Jose Mesa
(74) *Attorney, Agent, or Firm* — Oblon, Spivak, McClelland, Maier & Neustadt, L.L.P.

(57) ABSTRACT

Provided is an electronic apparatus including a storage configured to store video contents shot by a user; a reproducer configured to reproduce the stored video contents; a controller configured to analyze each of the video contents to extract lower meta-information items, to analyze the extracted lower meta-information items to derive an upper meta-information item, and to calculate, based on an upper meta-information item of a first video content being reproduced and upper meta-information items of second video contents other than the first video content among the video contents, a score for each of the second video contents; and an output unit configured to output, according to the calculated score, a recommendation information item for recommending at least one of the second video contents after the reproduction of the first video content is stopped.

15 Claims, 18 Drawing Sheets

|  | A | B | C | D | E | F | G | H | I | J | K | L |
|---|---|---|---|---|---|---|---|---|---|---|---|---|
| 10/10/2009 | 4 | 2 | 45 | 4 |  |  |  |  |  |  |  |  |
| 2009 |  |  |  |  |  | 27 |  |  |  |  |  |  |
| October |  |  |  |  |  |  |  |  |  |  |  |  |
| 10th |  |  |  |  |  |  |  |  |  |  |  | 23 |
| Autumn |  |  |  |  | 3 |  |  |  |  |  |  |  |
| Age: 6 |  | 3 |  |  |  |  |  |  | 2 | 1 |  |  |
| Male |  |  |  |  |  |  |  |  |  |  |  |  |
| Elementary school student |  |  | 4 |  |  | 32 |  |  |  |  |  |  |
| Elementary school |  |  |  |  |  |  |  |  | 1 | 23 |  |  |
| School |  |  |  |  |  |  |  | 45 |  |  |  |  |
| Participate athletic meet |  | 10 |  | 3 | 13 |  | 4 |  |  |  | 4 | 1 |
| Participate event | 2 |  |  |  |  |  |  |  |  |  |  |  |

FIG.10

| next | A | B | C | D | E | F | G | H | I | J | K | L |
|---|---|---|---|---|---|---|---|---|---|---|---|---|
| 10/10/2009 | 1 |   | 1 |   |   | 1 | 4 |   |   | 1 |   |   |
| 2009 | 5 | 2 | 1 | 4 |   | 1 |   |   |   | 1 |   |   |
| October | 1 |   | 46 |   |   | 28 |   |   |   | 1 |   |   |
| 10th | 1 |   | 1 |   |   | 1 |   |   |   | 1 |   | 23 |
| Autumn | 1 |   | 1 |   | 3 | 1 |   |   |   | 2 |   |   |
| Child X | 1 |   | 1 |   |   | 1 |   |   |   | 1 |   |   |
| Age: 6 | 1 | 3 | 1 |   |   | 1 |   |   | 2 | 1 |   |   |
| Male | 1 |   | 1 |   |   | 1 |   |   |   | 1 |   |   |
| Elementary school student | 1 |   | 1 |   |   | 33 |   |   |   | 1 |   |   |
| Elementary school | 1 |   | 5 |   |   | 1 |   | 45 |   | 24 |   |   |
| School | 1 |   | 1 |   |   | 1 |   |   | 1 | 1 |   |   |
| Participate athletic meet | 1 | 10 | 1 |   |   | 1 |   |   |   | 1 | 4 | 1 |
| Participate event | 3 |   | 1 | 3 | 13 | 1 | 4 |   |   | 1 |   |   |

FIG.11

| 10/10/2009 | 2009 | October | 10th | Autumn | Child X | Age: 6 | Male | Elementary school student | Elementary school | School | Participate athletic meet | Participate event |
|---|---|---|---|---|---|---|---|---|---|---|---|---|
| 1.0 | | | | | 1.0 | | | | 1.0 | | 1.0 | |
| 1.0 | | | | | 1.0 | | | | 1.0 | | | |
| 1.0 | | | | | 1.0 | | | | | | | |
| 1.0 | | | | | | | | | | | | |
| | | | | | 1.0 | | | | 1.0 | | 1.0 | |
| | 0.16 | 0.16 | 0.16 | | 1.0 | | | | 1.0 | | 1.0 | |
| | 0.16 | 0.16 | | | | | | | | | 1.0 | |
| | | 0.16 | 0.16 | | | | | | | | | |

FIG.15

| 10/10/2009 | 2009 | October | 10th | Autumn | Child X | Age: 6 | Male | Elementary school student | Elementary school | School | Participate athletic meet | Participate event |
|---|---|---|---|---|---|---|---|---|---|---|---|---|
| 1.0 | 0.16 | 0.16 | 0.16 | 0.08 | 1.0 | 0.25 | 0.25 | 0.125 | 1.0 | 0.5 | 1.0 | 0.5 |
|  | 0.16 | 0.16 | 0.16 | 0.08 | 1.0 | 0.25 | 0.25 | 0.125 | 1.0 | 0.5 | 1.0 | 0.5 |
| 1.0 | 0.16 | 0.16 | 0.16 | 0.08 |  | 0.25 | 0.25 | 0.125 | 1.0 | 0.5 | 1.0 | 0.5 |
| 1.0 | 0.16 | 0.16 | 0.16 | 0.08 | 1.0 | 0.25 | 0.25 | 0.125 |  | 0.5 | 1.0 | 0.5 |
| 1.0 | 0.16 | 0.16 | 0.16 | 0.08 |  | 0.25 | 0.25 | 0.125 | 1.0 | 0.5 |  | 0.5 |
|  | 0.16 | 0.16 | 0.16 | 0.08 | 1.0 | 0.25 | 0.25 | 0.125 |  | 0.5 | 1.0 | 0.5 |
|  | 0.16 | 0.16 | 0.16 |  | 1.0 | 0.25 | 0.25 | 0.125 |  |  | 1.0 | 0.5 |
|  | 0.16 | 0.16 | 0.16 |  | 1.0 | 0.25 | 0.25 | 0.125 | 1.0 | 0.5 |  | 0.5 |

ELECTRONIC APPARATUS, CONTENT RECOMMENDATION METHOD, AND PROGRAM THEREFOR

BACKGROUND OF THE INVENTION

1. Field of the Invention

The present invention relates to an electronic apparatus capable of recommending, among video contents shot by a user, a video content that a user might want to view, so as to reproduce the video content, and to a content recommendation method and a program in the electronic apparatus.

2. Description of the Related Art

In the related art, a technique of recommending a video content (hereinafter, abbreviated as video) that a viewer of a certain video supposedly wants to view next has been used in "YouTube" (URL: http://www.youtube.com), for example.

In the recommendation technique, information items of "tag information", "evaluation of viewer", and "action of viewer" indicating a title, a tag, and a description which are associated with a video have been used. The "tag information" includes information items that are considered by a creator of a video to be associated with the video, and those information items need to be input by the creator. The degree of freedom of the tag information as information is high, but the tag information depends on subjective view of the creator. Specifically, one thinks that videos are similar to each other, the other may not think so. The "evaluation of viewer" includes evaluation information items of videos by viewers. For example, the evaluation includes good, middle, and bad evaluations. Those information items need to be input by the viewers. The "action of viewer" includes information items regarding the fact that an image has been reproduced to the end, the fact that a video has been shifted to another video in the middle, and which video is viewed before another video is viewed, and those information items need to be input by viewers.

The recommendation technique is mainly divided into a "rule-based" system, a "content-based" system, and a "collaborative filtering" system.

The "rule-based" system means a technique in which a recommendation rule is predetermined, for example, "in a case of A, B is recommended". This technique uses the "tag information". Therefore, as information items to be used are increased, the maintenance and inputs for rule setting become troublesome. Further, in a case where no tag information can be obtained, it does not work well.

The "content-based" system means a technique of measuring similarity between videos, and recommending a similar video. In this technique, the "tag information" is used. Therefore, if tag information items between videos are not different from each other contents similar to each other may be recommended. Further, in a case where no tag information item can be obtained, it does not work well.

The "collaborative filtering" system means a technique of calculating similarity of preferences between users based on information items of "evaluation of viewer", "action history of viewer", and the like irrespective of the contents of the videos, and recommending a video, which the user has not viewed yet, taking a user having a high similarity in preference with respect to a target user for reference. Further, other than the user-based system of calculating the similarity of preferences between users, there has also been a content-based system of calculating the similarity between videos based on "evaluation of viewer" or "action history of viewer". Both methods as described above perform a recommendation based on part not associated with the contents of videos, and hence there is a possibility that surprising contents are recommended. In addition, in the above-mentioned methods, it is difficult to obtain a sufficient result if histories of users are not sufficiently accumulated.

SUMMARY OF THE INVENTION

The above-mentioned techniques are generally used when unspecified number of users view numerous videos. Therefore, in a case where each of the above-mentioned techniques is applied for recommending videos (personal contents) shot by a user, the following problems arise.

In the "rule-based" system, the user uses the "tag information", and hence when the number of information items to be handled is increased, the rule setting becomes cumbersome. Further, the "tag information" is subjective information, and hence rules do not work well.

Also in the "content-based" system, similarly to the "rule-based" system, the "tag information" is used. However, in the "content-based" system, as long as single user adds the "tag information" items, the use of the "tag information" items does not cause a problem. However, in a case where a plurality of users add the "tag information" items, the addition is based on the subjective views of the users, and hence it is difficult to suitably measure the similarity thereof.

In the "collaborative filtering" system, views by unspecified number of users are not performed, and hence histories of users to be compared are not sufficiently accumulated. Therefore, a sufficient result may not be obtained. Further, although in order to accommodate the above-mentioned situation, a method of using the Internet to collect histories is conceivable, in a case of the personal contents, it is difficult for users other than the user having the personal contents to view those contents. For that reason, it may be impossible to use the method of using the Internet in the "collaborative filtering" system.

In view of the circumstances as described above, there is a need for providing an electronic apparatus, a content recommendation method, and a program therefor, which are capable of recommending, among a plurality of video contents shot by a user, a video content that a user might want to view with high probability as much as possible.

According to an embodiment of the present invention, there is provided an electronic apparatus including a storage, a reproducer, a controller, and an output unit. The storage stores a plurality of video contents shot by a user. The reproducer reproduces the plurality of stored video contents. The controller analyzes each of the plurality of video contents to extract a plurality of lower meta-information items, analyzes the plurality of extracted lower meta-information items to derive an upper meta-information item, calculates, based on an upper meta-information item of a first video content being reproduced and upper meta-information items of a plurality of second video contents other than the first video content among the plurality of video contents, a score for each of the plurality of second video contents. The output unit outputs, according to the calculated score, a recommendation information item for recommending at least one of the plurality of second video contents after the reproduction of the first video content is stopped.

With this, the electronic apparatus is capable of extracting the plurality of lower meta-information items from the video contents shot by the user, deriving, from the extracted lower meta-information items, the upper meta-information items, and determining a recommended content based on the similarity between the upper meta-information items. Thus, the electronic apparatus is capable of recommending a video content that the user really wants to view among the plurality of the video contents shot by the user, without causing the user to separately add meta-information such as the tag information.

The storage may store a plurality of rule information items for calculating the score, the plurality of rule information items being different for each of the upper meta-information items. In this case, the controller may extract, from the plurality of stored rule information items, one of the plurality of rule information items, which corresponds to the upper meta-information item of the first video content, and may calculate the score as a matching degree with respect to the extracted rule information item.

With this, the electronic apparatus generates the rule information item for each of the upper meta-information items, and hence the electronic apparatus is capable of suppressing increase of rules and complexity as compared to a case of using the subjective tag information as seen in the related art, while the electronic apparatus uses the rule-based recommendation system in the related art.

The controller may expand the upper meta-information item of the first video content into the plurality of lower meta-information items and may extract a rule information item matching all of the plurality of expanded lower meta-information items in a case where the rule information item corresponding to the upper meta-information item of the first video content is not extracted.

With this, the electronic apparatus uses the tree structure to expand the upper meta-information items into the lower meta-information items, to thereby search for the rule information items based on the lower meta-information items, and hence the electronic apparatus is capable of recommending a video content that the user wants to view even if the rule information item matching with the upper meta-information item is not founded.

The storage may store a reproduction history information item including an information item indicating the number of times of reproduction of the reproduced video content, and an information item about a video content reproduced immediately after the reproduced video content while the reproduction history information item being associated with the upper meta-information item of the reproduced video content. In this case, the controller may calculate the score as a possibility with which each of the plurality of second video contents is reproduced immediately after the first video content, based on the upper meta-information item of the first video content and the stored reproduction history information item.

With this, the electronic apparatus stores the viewing history information item for each of the meta-information items, and hence the electronic apparatus is capable of preventing the viewing history information items from being dispersed as compared to a case of storing the viewing history information items by video title or the like. In addition, the electronic apparatus is capable of performing a recommendation with high accuracy while the electronic apparatus uses the system closely resembling the collaborative filtering system in the related art, without storing unspecified number of viewing history information items.

The storage may store a reproduction history information item including an information item indicating the number of times of reproduction of the reproduced video content while the reproduction history information item being associated with the upper meta-information item of the reproduced video content. In this case, the controller may expand each of the upper meta-information items of the first video content and the plurality of second video contents into the plurality of lower meta-information items, and may calculate the score by summing up the number of times of reproduction for each of the lower meta-information items of the plurality of second video contents including lower meta-information items matching with any of the lower meta-information items of the first video content.

With this, the electronic apparatus counts the number of times of reproduction for each of the lower meta-information items expanded from the upper meta-information items, and hence even if the viewing history information items are not sufficiently accumulated for each of the upper meta-information items, the electronic apparatus is capable of substantially increasing the reproduction history information items, to thereby perform a recommendation.

The upper meta-information item may include a plurality of components. In this case, the controller may divide the upper meta-information items into a plurality of partial upper meta-information items for each of the plurality of components, and may calculate the score for each of plurality of combinations of the divided partial upper meta-information items. In this case, the output unit may output a recommendation information item for each of the combinations.

With this, the electronic apparatus allows, even after the upper meta-information item is derived, the score calculation for each of the combinations of the partial upper meta-information items, and hence the electronic apparatus is capable of flexibly performing a recommendation depending on demands of the user.

According to another embodiment of the present invention, there is provided a content recommendation method including storing a plurality of video contents shot by a user. The plurality of stored video contents are reproduced. Each of the plurality of video contents is analyzed and a plurality of lower meta-information items are extracted. In addition, the plurality of extracted lower meta-information items are analyzed, and an upper meta-information item is derived. Based on an upper meta-information item of a first video content being reproduced and upper meta-information items of a plurality of second video contents other than the first video content among the plurality of video contents, a score for each of the plurality of second video contents is calculated. According to the calculated score, a recommendation information item for recommending at least one of the plurality of second video contents is output after the reproduction of the first video content is stopped.

According to still another embodiment of the present invention, there is provided a program to cause an electronic apparatus to execute a storing step, a reproducing step, an extracting step, a deriving step, a calculating step, and an outputting step. In the storing step, a plurality of video contents shot by a user are stored. In the reproducing step, the plurality of stored video contents are reproduced. In the extracting step, each of the plurality of video contents is analyzed and a plurality of lower meta-information items are extracted. In the deriving step, the plurality of extracted lower meta-information items are analyzed, and an upper meta-information item is derived. In the calculating step, based on an upper meta-information item of a first video content being reproduced and upper meta-information items of a plurality of second video contents other than the first video content among the plurality of video contents, a score for each of the plurality of second video contents is calculated. In the outputting step, according to the calculated score, a recommendation information item for recommending at least one of the plurality of second video contents is output after the reproduction of the first video content is stopped.

As described above, according to the embodiments of the present invention, it is possible to recommend, among a plurality of video contents shot by a user, a video content that a user might want to view with high probability as much as possible.

These and other objects, features and advantages of the present invention will become more apparent in light of the following detailed description of best mode embodiments thereof, as illustrated in the accompanying drawings.

BRIEF DESCRIPTION OF DRAWINGS

FIG. 10 is a view showing an example of a table showing the number of view for each of meta-information items of a video being reproduced and other videos in the method of FIG. 8;

FIG. 11 is a view showing another example of a table showing the number of view for each of the meta-information items of the video being reproduced and other videos in the method of FIG. 8;

FIG. 15 is a table showing an example of combination of rules in another embodiment of the present invention;

FIG. 17 is a table showing an example of combination of rules in another embodiment of the present invention.

DESCRIPTION OF PREFERRED EMBODIMENTS

Hereinafter, embodiments of the present invention will be described with reference to the drawings.

[Hardware Configuration of PVR]

Figure 1:
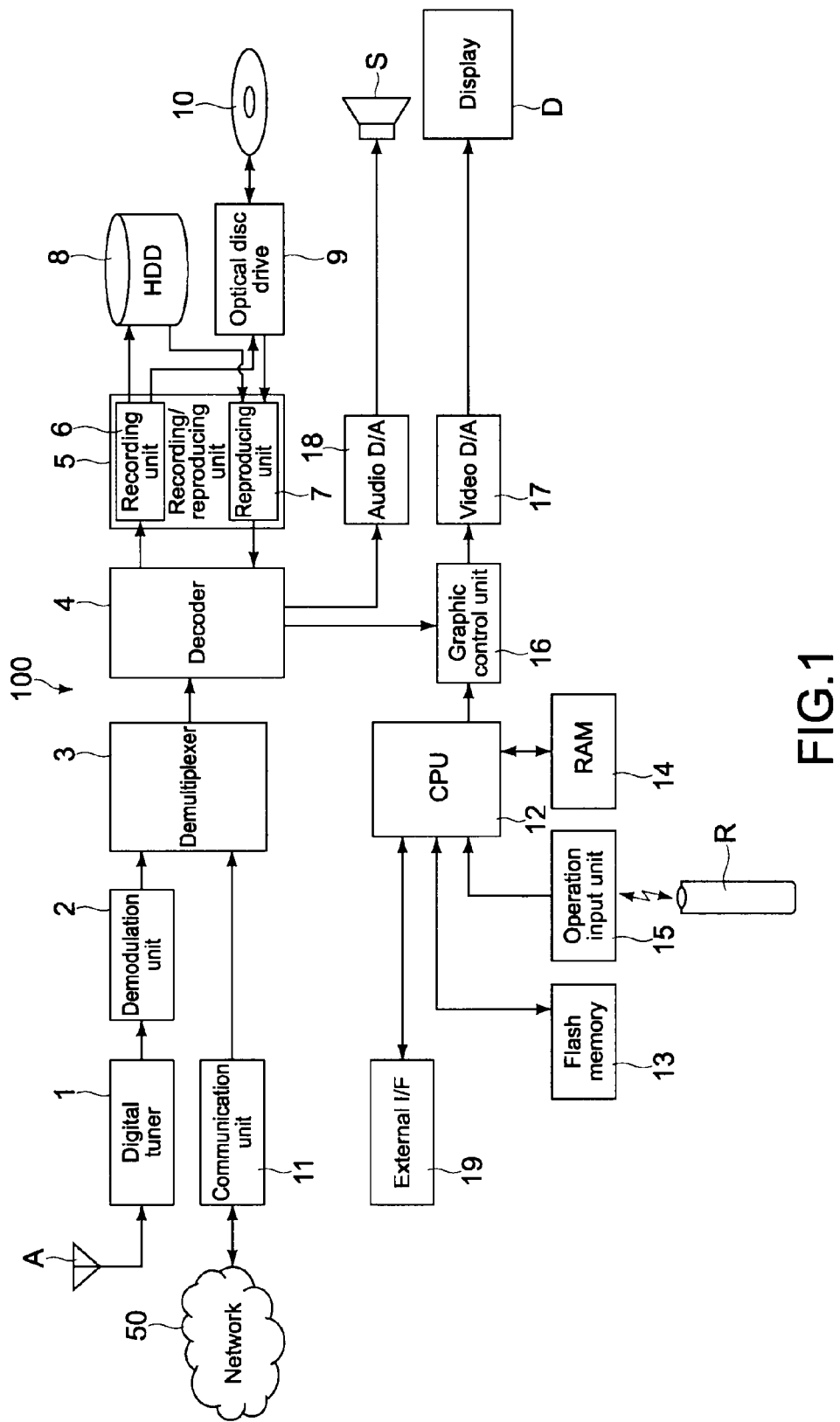
FIG. 1 is a view showing a hardware configuration of a PVR according to an embodiment of the present invention.

FIG. 1 is a view showing a hardware configuration of a personal video recorder (PVR) according to an embodiment of the present invention.

As shown in FIG. 1, the PVR 100 includes a digital tuner 1, a demodulation unit 2, a demultiplexer 3, a decoder 4, a recording/reproducing unit 5, a hard disk drive (HDD) 8, an optical disc drive 9, and a communication unit 11. Further, the PVR 100 includes a central processing unit (CPU) 12, a flash memory 13, and a random access memory (RAM) 14. In addition, the PVR 100 includes an operation input unit 15, a graphic control unit 16, a video digital/analog (D/A) converter 17, an audio digital/analog (D/A) converter 18, and an external interface 19.

The digital tuner 1 selects, under the control of the CPU 12, a certain channel in digital broadcasting via an antenna A, and receives a broadcast signal including data of a program. Although the broadcast signal is, for example, an MPEG stream encoded in MPEG-2 TS format (TS: Transport Stream), it is not limited to this format. The demodulation unit 2 demodulates the modulated broadcast signal.

The demultiplexer 3 demultiplexes the multiplexed broadcast signal into signals including a video signal, an audio signal, a closed-caption signal, a service information (SI) signal, and the like. Then, the demultiplexer 3 supplies the above-mentioned signals to the decoder 4.

The decoder 4 decodes the video signal, the audio signal, the closed-caption signal, and the SI signal, which are demultiplexed by the demultiplexer 3. The decoded signals are supplied to the recording/reproducing unit 5.

The recording/reproducing unit 5 includes a recording unit 6 and a reproducing unit 7. When a video signal and an audio signal are decoded by the decoder 4 and are input into the recording unit 6, the recording unit 6 temporarily accumulates the video signal and the audio signal, and outputs the video signal and the audio signal to the HDD 8 or the optical disc drive 9 while controlling a timing and a data amount thereof, so that the HDD 8 or the optical disc drive 9 records the video signal and the audio signal. Further, the recording unit 6 is also capable of reading a content recorded in the HDD 8 and outputting the content to the optical disc drive 9 so that the optical disc drive 9 records the content on an optical disc 10. The reproducing unit 7 reads the video signal and the audio signal for a video content, which is recorded in the HDD 8 or on the optical disc 10, and outputs the video signal and the audio signal to the decoder 4 while controlling a timing and a data amount thereof. In this manner, the video signal and the audio signal are reproduced.

The HDD 8 records, in a built-in hard disc, a program received through the digital tuner 1, various contents received through the communication unit 11 over the network 50, and content data of videos, still images, and the like, which are shot by a user. When the stored contents are reproduced, the HDD 8 reads data thereof from the hard disc, and outputs the data to the recording/reproducing unit 5.

Further, there is a case where the HDD 8 stores various programs, other data, and the like. When the various programs and the other data are executed and referred to, the various programs and the other data are read from the HDD 8 in response to an instruction sent from the CPU 12, and are expanded in a RAM 14.

The optical disc drive 9 is, similarly to the HDD 8, capable of recording the various data of the program content and the like on the mounted optical disc 10 and of reading the recorded data. Further, the above-mentioned various programs may be recorded on a portable recording medium such as the optical disc 10 and may be installed through the optical disc drive 9 into the PVR 100. The optical disc includes, for example, a Blu-ray disc (BD), a digital versatile disc (DVD), and a compact disc (CD).

The communication unit 11 serves as a network interface to be connected to the network 50, for transmitting and receiving data with respect to a different device on the network 50 according to a protocol such as a transmission control protocol/internet protocol (TCP/IP). In a case where data received by the communication unit 11 is multiplexed data, the data is supplied to the demultiplexer 3.

The external interface 19 includes, for example, an USB interface, high-definition multimedia interface (HDMI), and a memory card interface. For example, the external interface 19 is connected to an external device such as a digital video camera or a digital still camera, or to a memory card, and reads the data of the videos and the still images, which are shot by the user, and the like from the external device or the memory card.

The CPU 12 accesses the RAM 14 and the like if necessary so as to generally control processes in respective blocks of the PVR 100. In this case, the processes include a reception process of video data, a reproducing process of contents, an meta-information extracting process, a content recommendation process, which will be described later, and the like.

The flash memory 13 is, for example, a NAND type flash memory serving as a nonvolatile memory in which an OS to be executed by the CPU 12 and firmware including programs, various parameters, and the like are stably stored. Further, the flash memory 13 includes software such as a recommendation application for recommendation of video contents, which will be described later, and various databases necessary for operation thereof.

The RAM 14 is used as a working area for the CPU 12 or the like. The RAM 14 is a memory for temporarily storing the OS, the programs, processed data, and the like during the reproducing process of the contents, the meta-information extracting process, or the content recommendation process.

In the operation input unit 15, various setting values and instructions according to operation by a user are input through a remote controller R including a plurality of keys, for example. The operation input unit 15 outputs the various setting values and the instructions to the CPU 12. It is needless to say that the operation input unit 15 may not be associated with the remote controller R, and may include a keyboard, a mouse, switches, and the like. In this case, the keyboard and the mouse are connected to the PVR 100, and the switches are provided to the PVR 100.

The graphic control unit 16 subjects the video signal output from the decoder 4 and other video data output from the CPU 12 to a graphic process such as an On-screen display (OSD) process. In this manner, the video signal to be displayed on a display D such as a television set (hereinafter, referred to as TV) is generated.

The video D/A converter 17 converts a digital video signal input from the above-mentioned graphic control unit 16 into an analog video signal. Then, the video D/A converter 17 outputs the analog video signal through a video output terminal and the like to the display D.

The audio D/A converter 18 converts a digital audio signal input from the above-mentioned decoder 4 into an analog audio signal. Then, the audio D/A converter 18 outputs the analog audio signal through an audio output terminal and the like to a speaker S of the TV or the like.

[Software Configuration of PVR]

Figure 2:
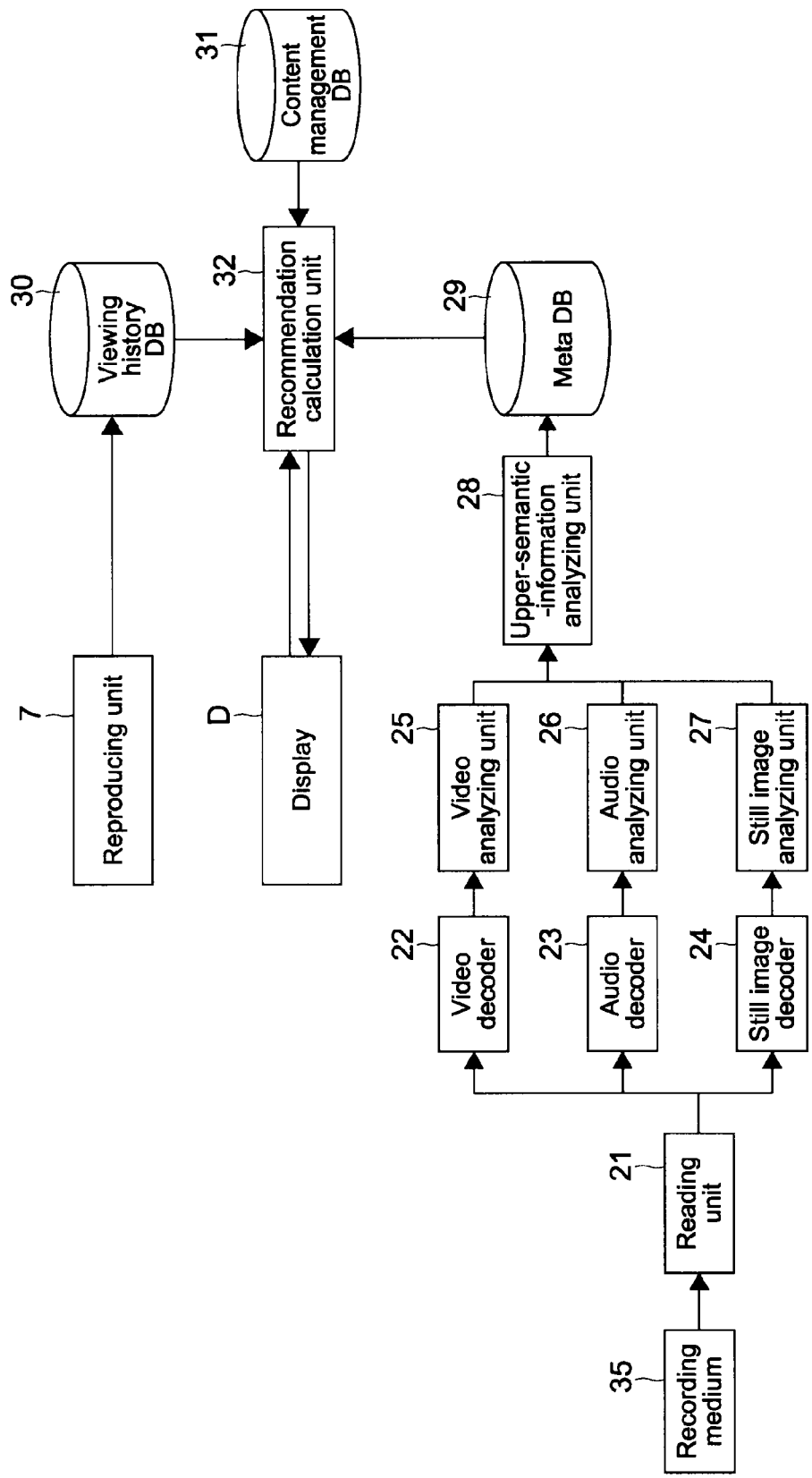
FIG. 2 is a view showing functional blocks of software included in the PVR for content recommendation according to the embodiment of the present invention.

FIG. 2 is a view showing functional blocks of software included in the PVR 100 for content recommendation.

As shown in FIG. 2, the PVR 100 includes a reading unit 21, a video decoder 22, an audio decoder 23, a still image decoder 24, a video analyzing unit 25, an audio analyzing unit 26, a still image analyzing unit 27, an upper-semantic-information analyzing unit 28, a meta database (DB) 29, a viewing history DB 30, a content management DB 31, and a recommendation calculation unit 32.

The reading unit 21 reads, from a recording medium 35, video contents and still image data items. The still image data items are read for each of groups corresponding to a date, a time band, and the like. In a case where read data is a video content, the reading unit 21 divides the video content into a video data item and an audio data item. Then, the reading unit 21 outputs the video data item to the video decoder 22, and the audio data item to the audio decoder 23. Otherwise, the reading unit 21 outputs a still image data item to the still image decoder 24.

The video decoder 22 decodes the above-mentioned video data item, and outputs the decoded video data item to the video analyzing unit 25. The audio decoder 23 decodes the above-mentioned audio data item, and outputs the decoded audio data item to the audio analyzing unit 26. The still image decoder 24 decodes the above-mentioned still image data item, and outputs the decoded still image data item to the still image analyzing unit 27.

The video analyzing unit 25 extracts, from the video data item, objective feature information items, and extracts, based on the feature information items, lower meta-information (semantic information) items. Similarly, the audio analyzing unit 26 and the still image analyzing unit 27 extract, from the audio data item and the still image data item, objective feature information items, and extract, based on the feature information items, lower meta-information items, respectively. For the above-mentioned extraction of the lower meta-information items, person feature information items or event feature information items are used. Further, for the above-mentioned extraction of the lower meta-information items, there is also used a technique described in Understanding Video Events: A Survey of Methods for Automatic Interpretation of Semantic Occurrences in Video, Gal Lavee, Ehud Rivlin, and Michael Rudzsky, IEEE TRANSACTIONS ON SYSTEMS, MAN, AND CYBERNETICS-PART C: APPLICATIONS AND REVIEWS, VOL. 39, NO. 5, September 2009.

The video analyzing unit 25 executes, in the extraction of the feature information items, for example, image-based processes such as color/texture feature extraction, gradient calculation, edge extraction, and object-based processes such as detection/recognition of people/faces, recognition of objects, motion detection/speed detection of people/faces/objects. In the detection of people, the video analyzing unit 25 uses, for example, feature filters indicating people shapes to detect area including a person (people) from a video. In the face detection, the video analyzing unit 25 uses, for example, feature filters showing features of positional relations between eyes, nose, eyebrows, cheeks, and the like, a skin information, or the like, to detect area including face(s) from a video.

In addition, the video analyzing unit 25 recognizes not only the presence and absence of people or faces, but also a specified person having a predetermined relation with respect to a user by using the above-mentioned person feature information items. For example, an edge intensity image feature, a frequency intensity image feature, a high-order autocorrelation feature, and a color-converted image feature can be used as the person feature information items. For example, in a case of using the edge intensity image feature, the video analyzing unit 25 stores, as feature data items of people being targets to be recognized (for example, parents, children, a partner, and friends who are associated with a user), gray images, and edge intensity images. Then, the video analyzing unit 25 extracts, from a face image of a person whose face is detected, an gray image and an edge intensity image as described above, and performs pattern matching on both gray images and both edge intensity images, to thereby recognize the face of the specified person.

Further, in the object recognition, the video analyzing unit 25 uses recognition models stored as the above-mentioned event feature information items to determine whether or not an object being a target to be identified is included in the video. The recognition models are constructed in advance from images for leaning by mechanical learning such as support vector machines (SVM).

In addition, the video analyzing unit 25 is capable of recognizing backgrounds in addition to people and objects in the videos. For example, the video analyzing unit 25 uses models, which are constructed in advance from images for learning by the mechanical learning such as the SVM, to classify backgrounds in the videos into scenes including city, indoors, outdoors, seacoast, in water, night scene, sunset, snow scene, crowded scene, for example.

In the extraction of the feature information items, the audio analyzing unit 26 detects, from the audio data items, human voices, environmental sound other than the human voices, and features in intensity/tone of those sounds, for example. In order to identify the human voice and the environmental sound, duration time of an audio having intensity equal to or higher than a predetermined value is used, for example.

In the extraction of the feature information items, the still image analyzing unit 27 executes, among analysis processes which can be executed by the video analyzing unit 25, static processes including color/texture feature extraction, gradient calculation, edge extraction, people/face/object detection, recognition of background.

Further, in a case where data items include tag (label) information items of text and the like, the analyzing units 25 to 27 also extract the tag information items thereof as the feature information items. The tag information items include, for example, information items indicating event contents and information items of shooting date and time, shooting location, and the like.

The analyzing units 25 to 27 extract, based on the extracted feature information items, lower meta-information (semantic information) items to which more specific meanings are added.

For example, the video analyzing unit 25 identifies, based on the extracted people features and face features, individuals, sex, age, facial expression, position, clothing, the number of people, and arrangement as the lower meta-information items. Further, the video analyzing unit 25 recognizes, based on the motion features, Activity including active/inactive activity, speedy/slow activity, standing/sitting/walking/running, and the like, and recognizes gesture of hands and the like.

The audio analyzing unit 26 extracts, for example, from the extracted audio features, clapping, cheer, speaker sounds, feelings corresponding to voices, laughing, screaming, spoken contents, the size of space according to reflection as the lower meta-information items.

The still image analyzing unit 27 recognizes, among meta-information items which can be recognized by the video analyzing unit 25, meta-information items which is not associated with the motion features.

For the extraction of the lower meta-information items, there can be used various methods including, for example, methods by state space representation such as Bayesian network, finite state machine, conditional random field (CRF), and hidden Markov model (HMM), methods by discrete event system such as Petri Net, constraint satisfaction model, and semantic model such as logic approach, pattern recognition/classification in the related art such as SVM, nearest neighbor method, neural network.

The upper-semantic-information analyzing unit 28 analyzes, based on the lower meta-information items extracted by the analyzing units 25 to 27, upper meta-information items. Then, the upper-semantic-information analyzing unit 28 derives the most upper meta-information item capable of globally describing one shot of a video or one group of still images, that is, event. For this event deriving process, there is also used a technique described in Event Mining in Multimedia Streams: Research on identifying and analyzing events and activities in media collections had led to new technologies and systems, Lexing Xie, Hari Sundaram, and Murray Campbell, Proceedings of the IEEE|Vol. 96, No. 4, April 2008.

Specifically, the upper-semantic-information analyzing unit 28 gradually increases the level of abstraction of a plurality of information items corresponding to 5W1H (Who, What, When, Where, Why, How) from the lower meta-information items, and finally categorizes one shot of a video or a plurality of still images as one event (upper meta-information item).

For example, in a case where from a video or a still image, meta-information items regarding people such as "a number of children", "a number of parents and children", and "gym clothes", meta-information items regarding motion of people such as "active motion" and "running", meta-information items regarding normal objects such as "school buildings" are extracted, meta-information items of "human voice through a speaker", "clapping", "cheer", and the like are extracted from an audio, and information items including a positional information item of "elementary school", a season (date and time) information item of "autumn", and the like are obtained as other meta-information items, the upper-semantic-information analyzing unit 28 combines those information items and then arrives at an event of "athletic meet at elementary school".

Further, for example, regarding the element of "Who" among the elements of 5W1H, the upper-semantic-information analyzing unit 28 is also capable of expressing the event with use of words meaning a specified person. That is, in a case where a lower meta-information item regarding a creator (user), his or her family, or the like is extracted as an information item representing "Who", the upper-semantic-information analyzing unit 28 is capable of more specifically determining the above-mentioned event as "athletic meet at elementary school of child X" by using the above-mentioned information item as it remains being as a lower meta-information item.

The meta DB 29 stores the upper meta-information item derived by the upper-semantic-information analyzing unit 28 and lower meta-information items, which have been used for the above-mentioned derivation.

The viewing history DB 30 stores viewing history information items indicating histories that the PVR 100 has reproduced video contents through the reproducing unit 7, that is, histories that a user has viewed videos. The viewing history information items are information items regarding the number of view of videos, the fact that a video has been viewed to the end, the fact that another video has been viewed in the middle of viewing a certain video, and which video has been viewed after viewing a certain video, for example. Further, the viewing history DB 30 may store evaluation information items for videos that the user has been viewed.

The content management DB 31 saves the list of videos described above, which can be reproduced by the PVR 100.

The recommendation calculation unit 32 uses the above-mentioned three DBs to generate the list of recommended video contents, and outputs the generated list to the display D. It is an ID of a video being reproduced that is input into the recommendation calculation unit 32, and it is the list of recommended video contents that is output. The video ID means an ID to be used for loading information items regarding the video being reproduced from the above-mentioned three DBs. A unique ID is added to each of the videos.

In this embodiment, the recommendation calculation unit 32 is capable of performing a recommendation of videos by two methods. The first method is a one that uses a combination system of a rule-based system and a content-based system, and the second method is one that uses a collaborative filtering system. In the following, details of a configuration of the recommendation calculation unit 32 and an operation of the PVR 100 will be described for each of the two methods.

[Recommendation Method Using Combination System of Rule-based System and Content-based System]

Figure 3:
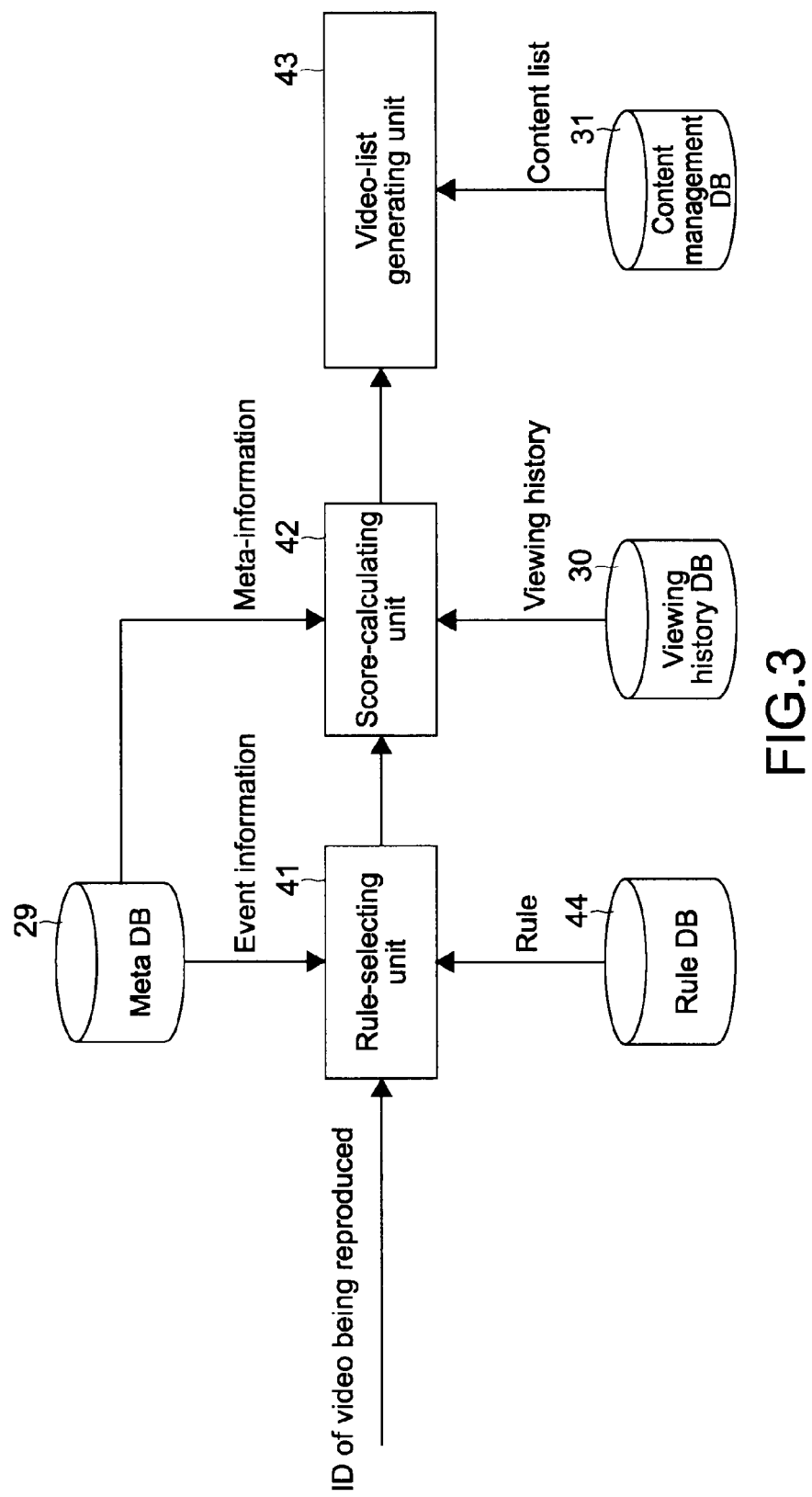
FIG. 3 is a view showing the details of a recommendation calculation unit in a case of performing a recommendation using a combination system of a rule-based system and a content-based system in the embodiment of the present invention.

FIG. 3 is a view showing the details of the recommendation calculation unit 32 in a case of performing a recommendation using the combination system of the rule-based system and the content-based system.

As shown in FIG. 3, the recommendation calculation unit 32 in this method includes a rule-selecting unit 41, a score-calculating unit 42, a video-list generating unit 43, and a rule DB 44.

The rule DB 44 stores, for each of the upper meta-information items (events), a rule information item serving as a reference for recommending an optimal video. That is, the rule DB 44 holds a significance degree of meta-information items (lower meta-information items and objective feature information items) to be used for the event extraction, for each of the events which can be recognized by the recommendation application. Here, the significance degree means a priority order serving as a reference for recommending videos.

For example, in a case where the event of "athletic meet at elementary school of child X" described above, the following items are exemplified as priority items.
(1) "Child X is included in the video" (the face is well focused and the face is not blurred)
(2) "Child X takes an active position" (priority on activity)
(3) "Child X is smiling"

On the other hand, in a case where only the event of "athletic meet at elementary school" is derived, the following items are exemplified as priority items.
(1) "Faces of elementary school students are included in the video as much as possible"
(2) "Active position is taken"
(3) "A lots of smiling faces are included in the video"

However, also in this case, similarly to the rule regarding the event of "athletic meet at elementary school of child X", the fact that a specified person is included in the video is included in rule information items. As a result, there is no problem when videos including "child X" are included in the list of recommended video contents.

The rule DB 44 stores scores depending on the significances, with respect to the priority items included as the rule information items. For example, in the phase in which the upper meta-information item is extracted, scores are generated with respect to the lower meta-information items with which the upper meta-information item is derived, depending on the upper meta-information item.

The rule-selecting unit 41 reads, from the meta DB 29, the event (upper meta-information item) of the video being currently reproduced, and reads, from the rule DB 44, a rule information item corresponding to the upper meta-information item.

The score-calculating unit 42 calculates scores with respect to all videos other than the video being reproduced, based on upper/lower meta-information items thereof in accordance with score information items included in the rule information items. For example, in the example of the athletic meet described above, "child X is included in the video" can be exemplified as a necessary condition. The score-calculating unit 42 adds scores, which are previously set with respect to the meta-information items, for example, in such a manner that, in each of the videos, if it comply with "child X is included I in the video and the frame is not blurred, but stabilized", 100 points are added, if it comply with "active position is taken", 50 points are added, if it comply with "smiling", 50 points are added. In this manner, the score-calculating unit 42 calculates scores of the videos.

The video-list generating unit 43 generates the list of recommended video contents based on the scores thus calculated, and outputs the generated list.

(Operation)

Next, the description will be made of a recommendation operation of the PVR 100 in this method. In the following, although the recommendation operation of the PVR 100 will be described while considering the recommendation calculation unit 32 of the recommendation application as a main operating subject, the operation is executed also in cooperation with the CPU 12 and other hardware and other software.

Here, first, the rule selection will be described in detail. Although the rule is selected according to the upper meta-information item of the video being reproduced, the corresponding rule is not necessarily prepared in advance.

Figure 4:
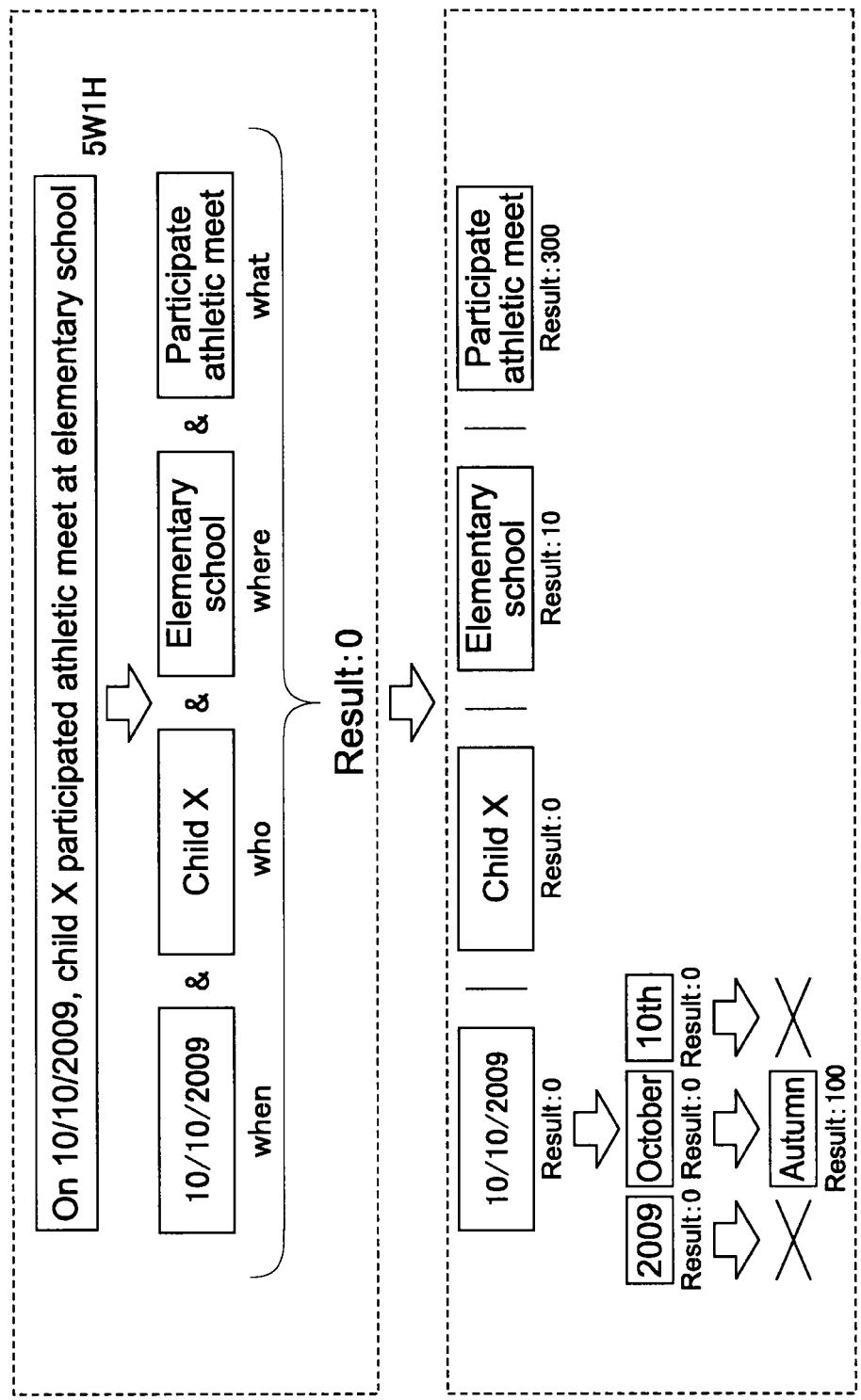
FIG. 4 is a view showing a flow of rule selection using a tree structure in a recommendation process by the method of FIG. 3.
Figure 5:
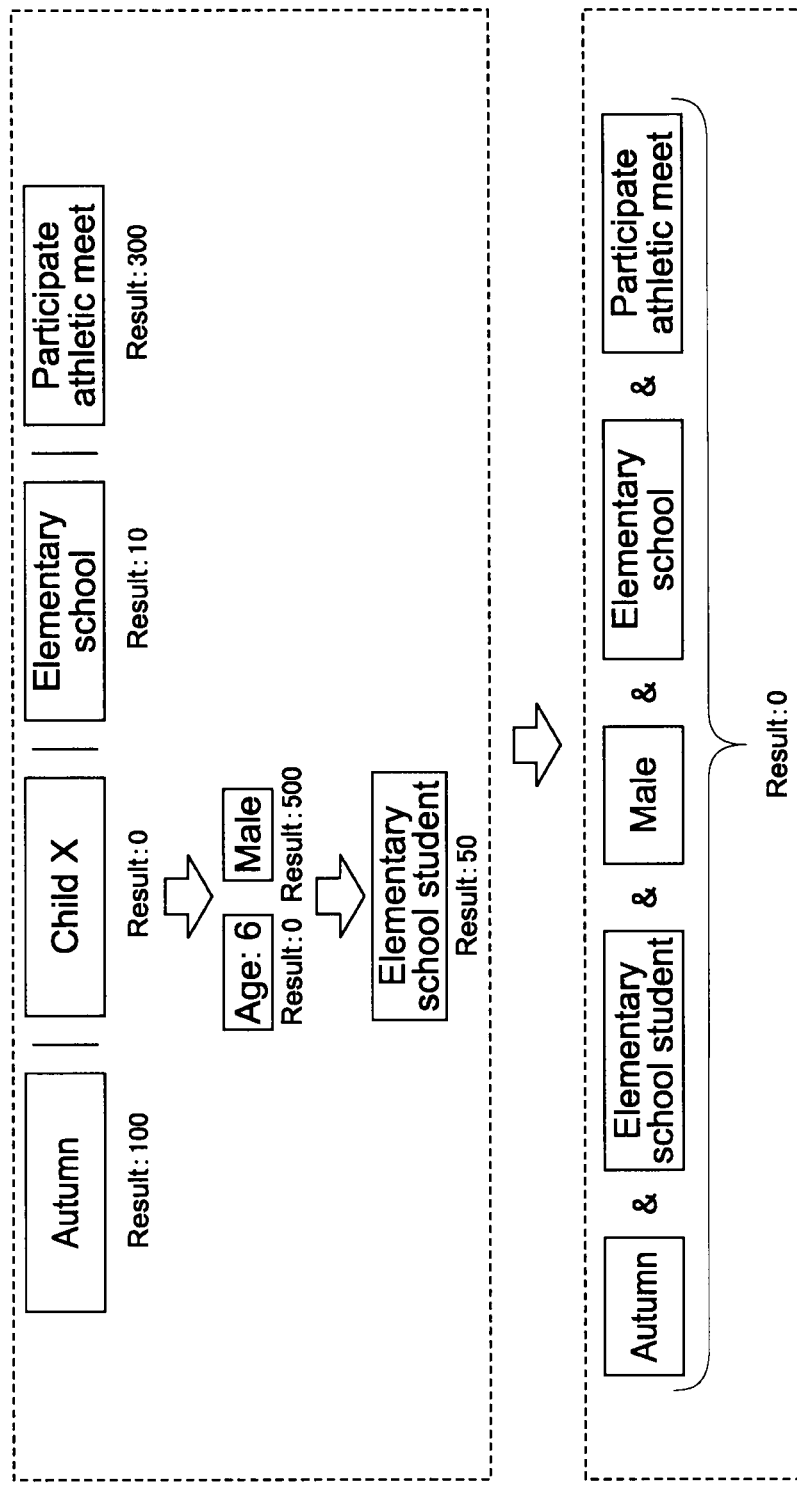
FIG. 5 is a view showing a flow of rule selection using a tree structure in the recommendation process by the method of FIG. 3.
Figure 6:
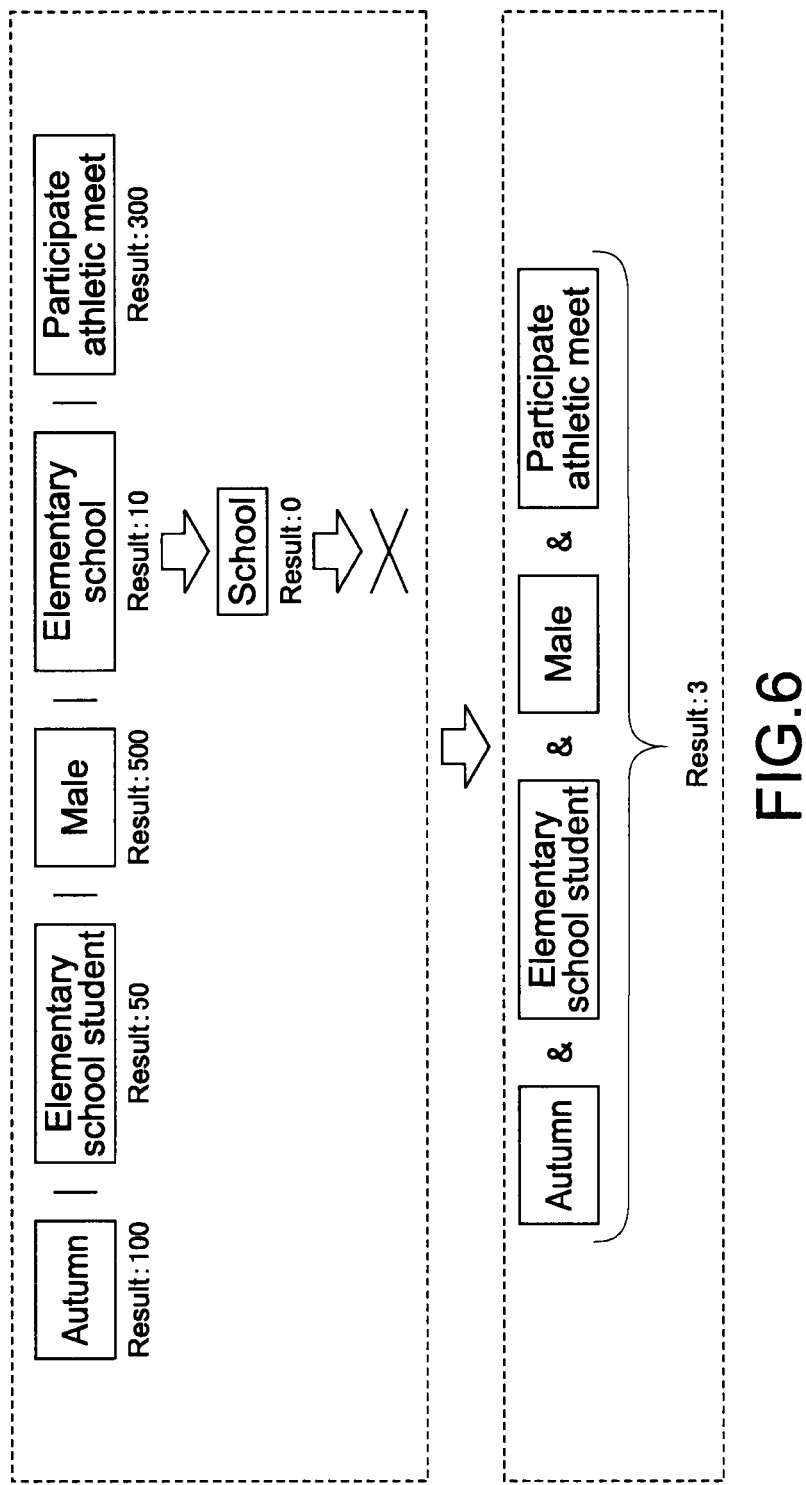
FIG. 6 is a view showing a flow of rule selection using a tree structure in the recommendation process by the method of FIG. 3.

In view of this, from upper meta-information items expressed by 5W1H, the recommendation calculation unit 32 further expands the meta-information items into lower meta-information items in a tree structure. With use of those further lower meta-information items, the recommendation calculation unit 32 performs the rule selection. FIG. 4 to FIG. 6 are views showing a flow of the rule selection using the above-mentioned tree structure.

As shown in FIG. 4, for example, in a case where it is an upper meta-information item of "on 10/10/2009, child X participates athletic meet at elementary school" that is input, the recommendation calculation unit 32 divides the above-mentioned upper meta-information item into partial upper meta-information items (hereinafter, referred to as partial upper meta-information items) of "10/10/2009, " "child X", "elementary school", and "participates athletic meet" in 5W1H elements. Then, the recommendation calculation unit 32 searches for rules including all of the partial upper meta-information items (hereinafter, referred to as AND search). When the corresponding rule is found, the recommendation calculation unit 32 calculates the above-mentioned score calculation according to that rule.

However, if the corresponding rule is not found, the recommendation is not performed. In this case, the recommendation calculation unit 32 performs rule search for each of the expanded partial upper meta-information items as shown in FIG. 4. The partial upper meta-information item having the minimum search result is further expanded to lower meta-information items, and the AND searches for rules are performed again. In this example, the search result with respect to "10/10/2009" is 0, and hence "10/10/2009" is expanded to "2009," "October", "10th", and the rule search is performed by using each of those lower meta-information items.

Here, in a case where the corresponding rule is not found (search result is 0), the recommendation calculation unit 32 further expands the lower meta-information items to lower meta-information items as shown in FIG. 5. In a case where a further lower meta-information item of a meta-information item does not exist at this time, the meta-information item is removed as shown in FIG. 6. When the search results with respect to all of the lower meta-information items becomes equal to or larger than 1 in this manner, the recommendation calculation unit 32 performs the AND search for rules by using those meta-information items thereof, and repeats the above-mentioned operation until the rule is found.

Here, the point is that when the "upper meta-information items" are used for the rule selection, it is possible to suppress increase of the rules and the complexity as compared to one that uses subjective tag information by users or creators. Further, when the meta-information items expanded in the tree structure are used also for rule determination, it is possible to accommodate various videos such as new videos. Further, when objective "lower meta-information items" are used also for the score calculation, the rule can stably work.

Figure 7:
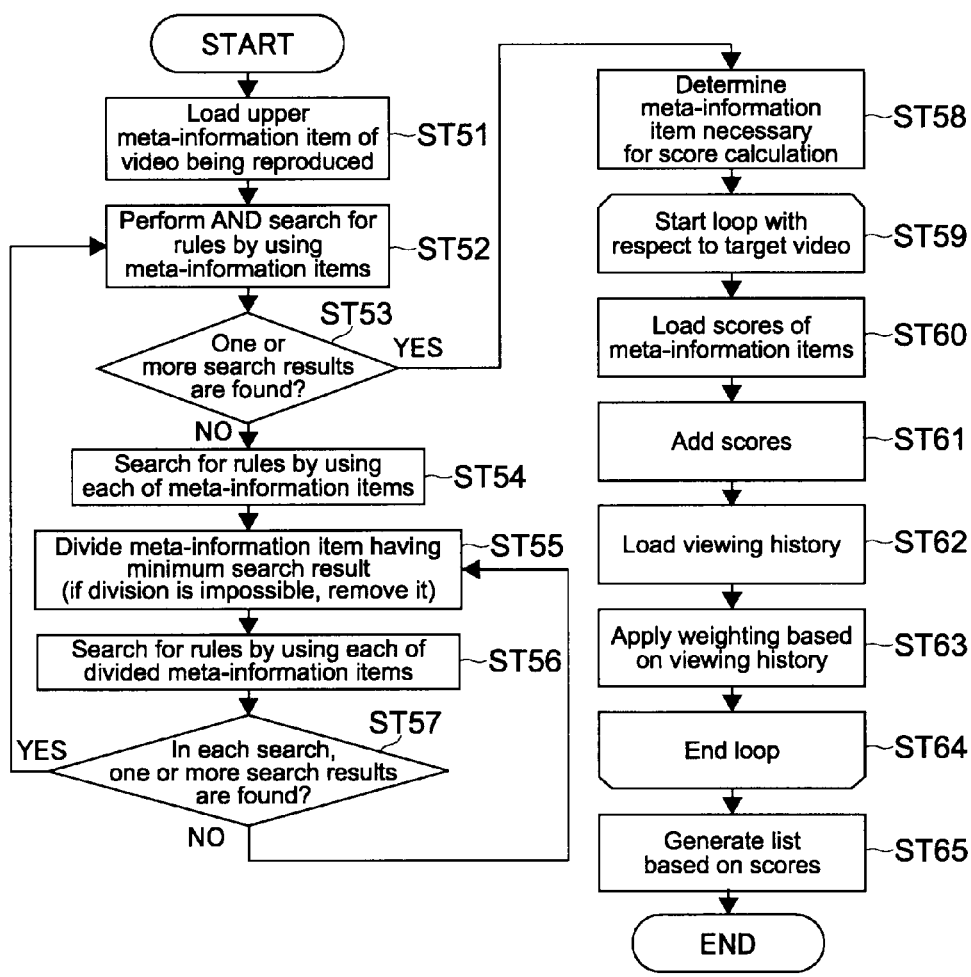
FIG. 7 is a flow chart showing a flow of the recommendation process by the method of FIG. 3.

FIG. 7 is a flow chart showing a flow of the recommendation process by the above-mentioned score-calculating unit 42.

As shown in FIG. 7, first, the score-calculating unit 42 loads the upper meta-information item of the video being reproduced (Step 51). Subsequently, the score-calculating unit 42 performs the AND search for rules by using partial upper meta-information items of the upper meta-information item (Step 52).

Subsequently, the score-calculating unit 42 determines whether or not one or more search results are found (Step 53). In a case where it is determined that one or more search results are not found, the rule search is performed by using each of the partial upper meta-information items as described above (Step 54).

Subsequently, the score-calculating unit 42 divides a partial upper meta-information item having the minimum search result into lower meta-information items (Step 55), and searches for rules by using each of the divided lower meta-information items (Step 56). In a case where a partial upper meta-information item cannot be divided into lower meta-information items, the partial upper meta-information item is removed.

The score-calculating unit 42 repeats the above-mentioned processes until one or more search result are found (Step 57).

In a case where it is determined that one or more search results are found, the score-calculating unit 42 determines a meta-information item necessary for the score calculation (Step 58). Then, the score-calculating unit 42 executes a loop process of score calculation with respect to all videos other than the video being reproduced (Step 59 to Step 64).

Specifically, the score-calculating unit 42 loads a score for each of the meta-information items with respect to each of the videos, and adds that score. Further, the score-calculating unit 42 applies weighting on the calculated score with use of the viewing history information items in the viewing history DB 30. For example, the score of video having high evaluation or video that a user has not viewed are increased, or the score of video having low evaluation is decreased.

Then, the score-calculating unit 42 generates the list of videos, for example, by sorting according to the order of scores through the video-list generating unit 43, and outputs the generated list to the display D (Step 65). The list is one in which thumbnails of the videos are arranged in a vertical direction or a horizontal direction, or in a matrix manner, for example. For example, videos having higher score are displayed while going to an upper left direction. The list is displayed, for example, after the reproduction of the video being reproduced is stopped.

[Recommendation Method Using Collaborative Filtering System]

Figure 8:
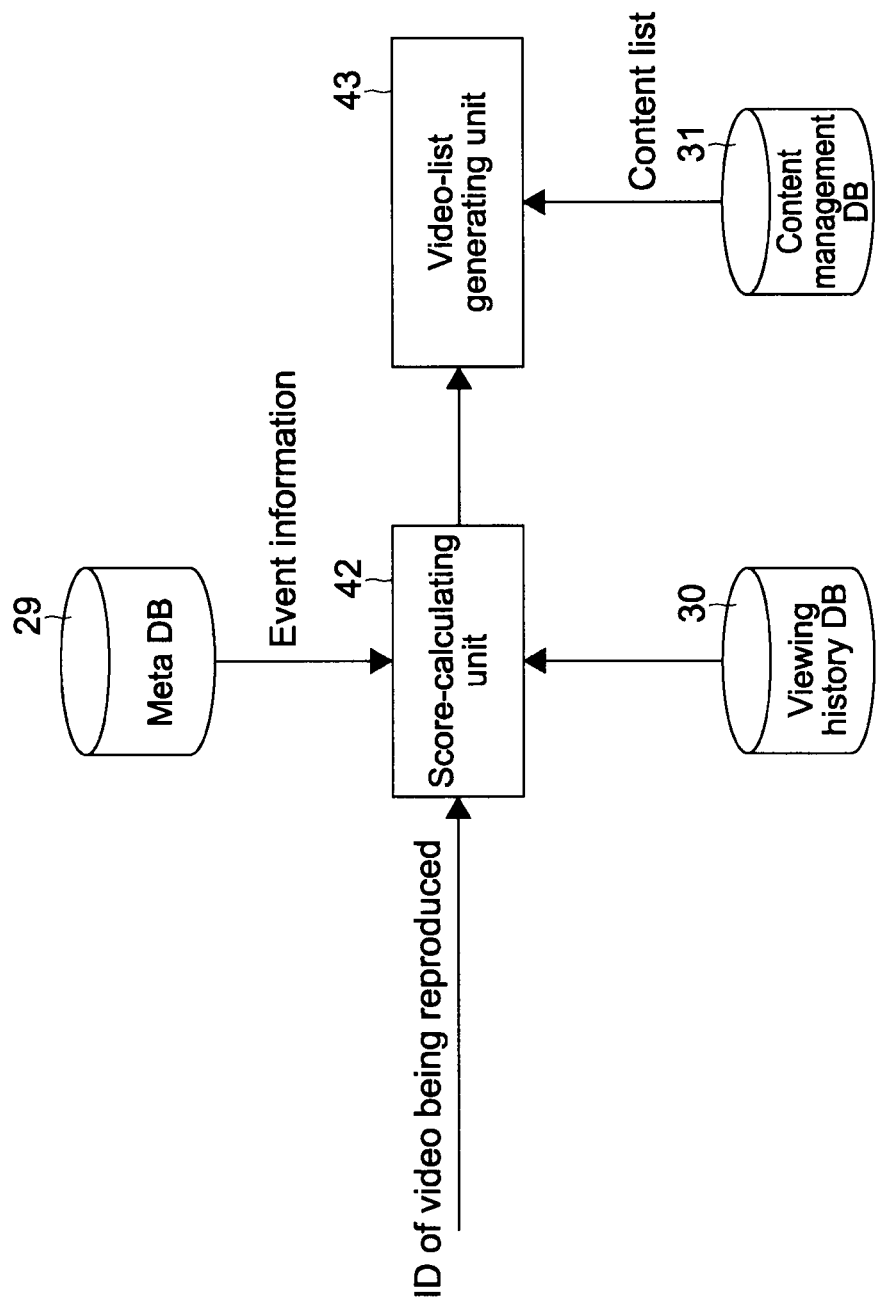
FIG. 8 is a view showing the details of the recommendation calculation unit in a case of performing a recommendation using a collaborative filtering system in the embodiment of the present invention.

FIG. 8 is a view showing the details of the recommendation calculation unit 32 in a case of performing a recommendation using the collaborative filtering system.

As shown in FIG. 8, the recommendation calculation unit 32 according to this method includes the score-calculating unit 42 and the video-list generating unit 43.

The score-calculating unit 42 calculates scores of the videos other than the video being reproduced based on the above-mentioned viewing history information items. As the method of calculating scores, various methods are conceivable. In the related art, it is general to use a method in which, for example, if the viewing history shows that a "video B" is often viewed after a "video A" is viewed, the score of "video B" is increased because the "video B" is viewed after the "video A" is viewed, with high probability. However, this method uses the history for each of videos, and, in general, one video is hardly viewed many times, and hence viewing histories are not sufficiently accumulated.

In view of this, the score-calculating unit 42 manages the viewing history information items for each of the upper meta-information items. For example, the score-calculating unit 42 manages an information item indicating how many times a user has viewed a video including an upper meta-information item of "school play" after a video including an upper meta-information item of "athletic meet". When the upper meta-information items are used, more viewing histories are accumulated as compared to a case of managing videos by title, and hence it is possible to perform a recommendation with higher accuracy.

The function of the video-list generating unit 43 is the same as that described above with reference to FIG. 3.

Further, even in this method, similarly to the combination system of the rule-based system and the content-based system, the meta-information items expanded in the tree structure are used, which allows more flexible recommendation with higher accuracy.

Figure 9:
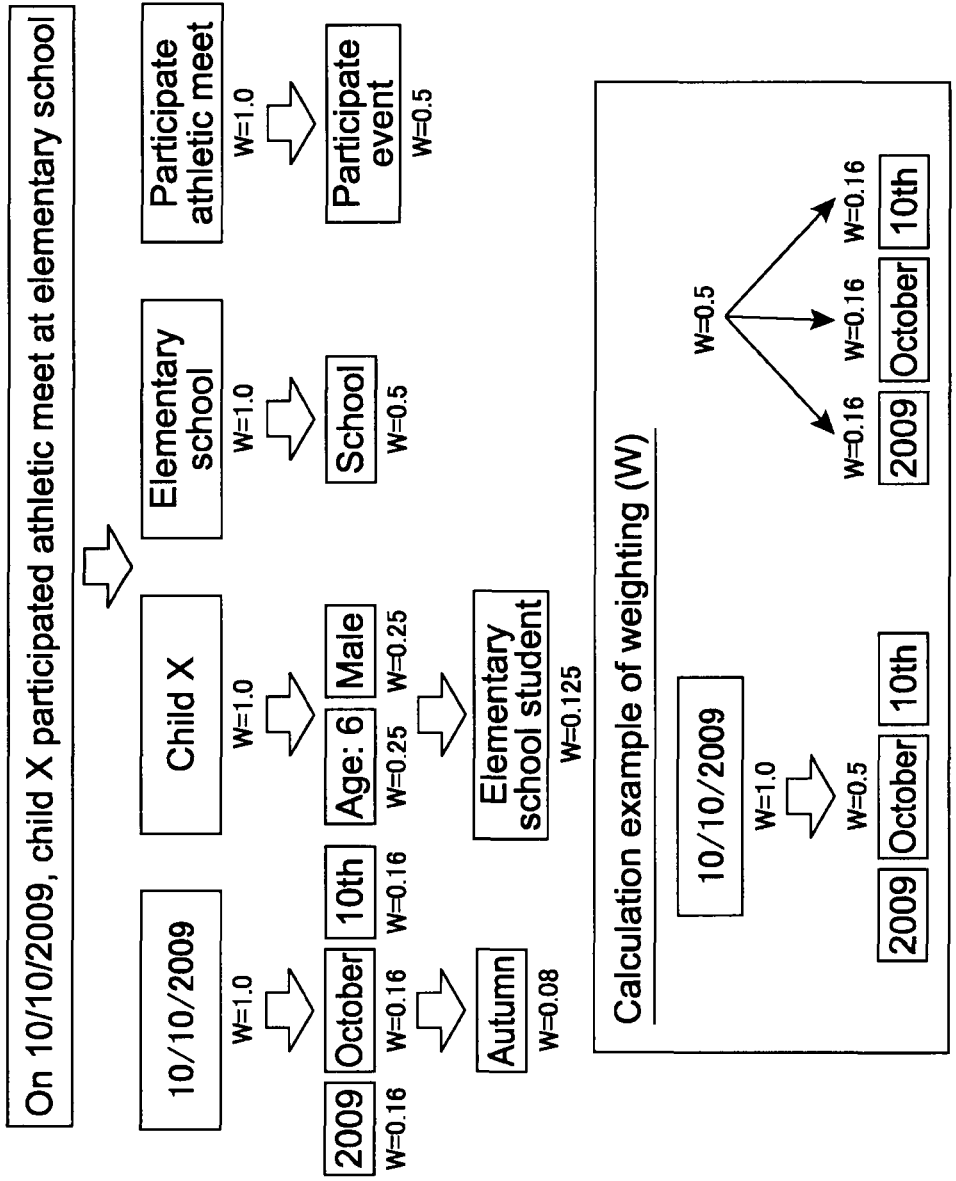
FIG. 9 is a view showing an upper meta-information item expanded into a tree structure in a recommendation process by the method of FIG. 8.

FIG. 9 is a view showing the upper meta-information item expanded to the tree structure in a recommendation process according to this method.

As shown in FIG. 9, for example, in a case where it is the upper meta-information item of "on 10/10/2009, child X participates athletic meet at elementary school" that is input, all partial meta-information items are expanded in the tree structure.

Here, an example of a table in which meta-information items of a video being currently viewed by a user are arranged in a column and meta-information items of other videos being recommendation candidates are arranged in rows is shown in FIG. 10. The values in the drawing each indicate the number of view. For example, FIG. 10 shows that the number of times when a user views a video including a meta-information item of "A" after the user views the video including a meta-information item of "2009" is 4.

An example of a table in a case where the number of view is increased is shown in FIG. 11. This table can be generated based on the viewing history of a user, and hence the generated table does not necessarily need to be saved. In this example of FIG. 11, meta-information items are expanded as described with respect to FIG. 9.

The score-calculating unit 42 sets weighting for each of those meta-information items. In the example of FIG. 11, weightings are set as follows: an initial weighting of each upper meta-information item is 1.0 (w=1.0), and when the upper meta-information item is expanded to lower meta-information items, the initial weighting is divided by 2 and divided by the number of the expanded lower meta-information items so that the weightings on the expanded lower meta-information items are even.

The score-calculating unit 42 calculates scores for other videos based on the above-mentioned weightings. In a case where meta-information items after expansion of the videos, the scores of which are to be calculated, are "A", "C", "F", and "J", the score-calculating unit 42 calculates scores by multiplexing the number of view of each of the meta-information items with weighting. The score-calculating unit 42 performs the above-mentioned score calculation with respect to all videos. The above-mentioned scores are used as recommendation degrees.

Figure 12:
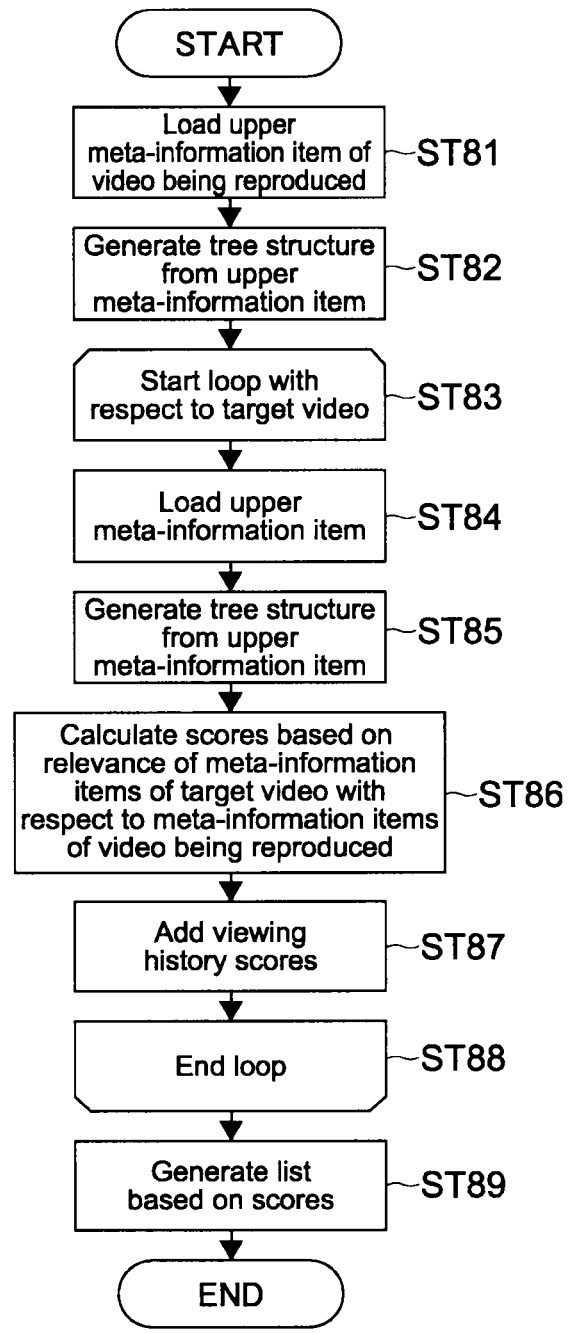
FIG. 12 is a flow chart showing a flow of the recommendation process by the method of FIG. 8.

FIG. 12 is a flow chart showing a flow of the recommendation process according to this method.

As shown in FIG. 12, the score-calculating unit 42 loads the upper meta-information item of the video being reproduced (Step 81), and generates, from upper meta-information item, the above-mentioned tree structure (Step 82).

Then, the score-calculating unit 42 executes a loop process of score calculation with respect to videos other than the video being reproduced (Step 83 to 88). Specifically, the score-calculating unit 42 loads an upper meta-information item of a video being a target for score calculation, generates, from the upper meta-information item, the tree structure, calculates a score based on relevance of meta-information items of the target video with respect to the meta-information items of the video being reproduced, and adds the calculated score as described above.

Then, the score-calculating unit 42 generates the list of recommended video contents based on the calculated scores and outputs the list (Step 89).

As described above, the score-calculating unit 42 uses the meta-information items expanded into the tree structure, and hence, even if histories of the number of view are not accumulated in the initial upper meta-information item, it is possible to perform a recommendation through the expanded lower meta-information items.

In addition, in a case where "school play" has a variation, for example, "school play of first graders" and "school play of second graders", there is also conceivable a method of calculating scores by using the above-mentioned "rule-based" recommendation method.

Figure 13:
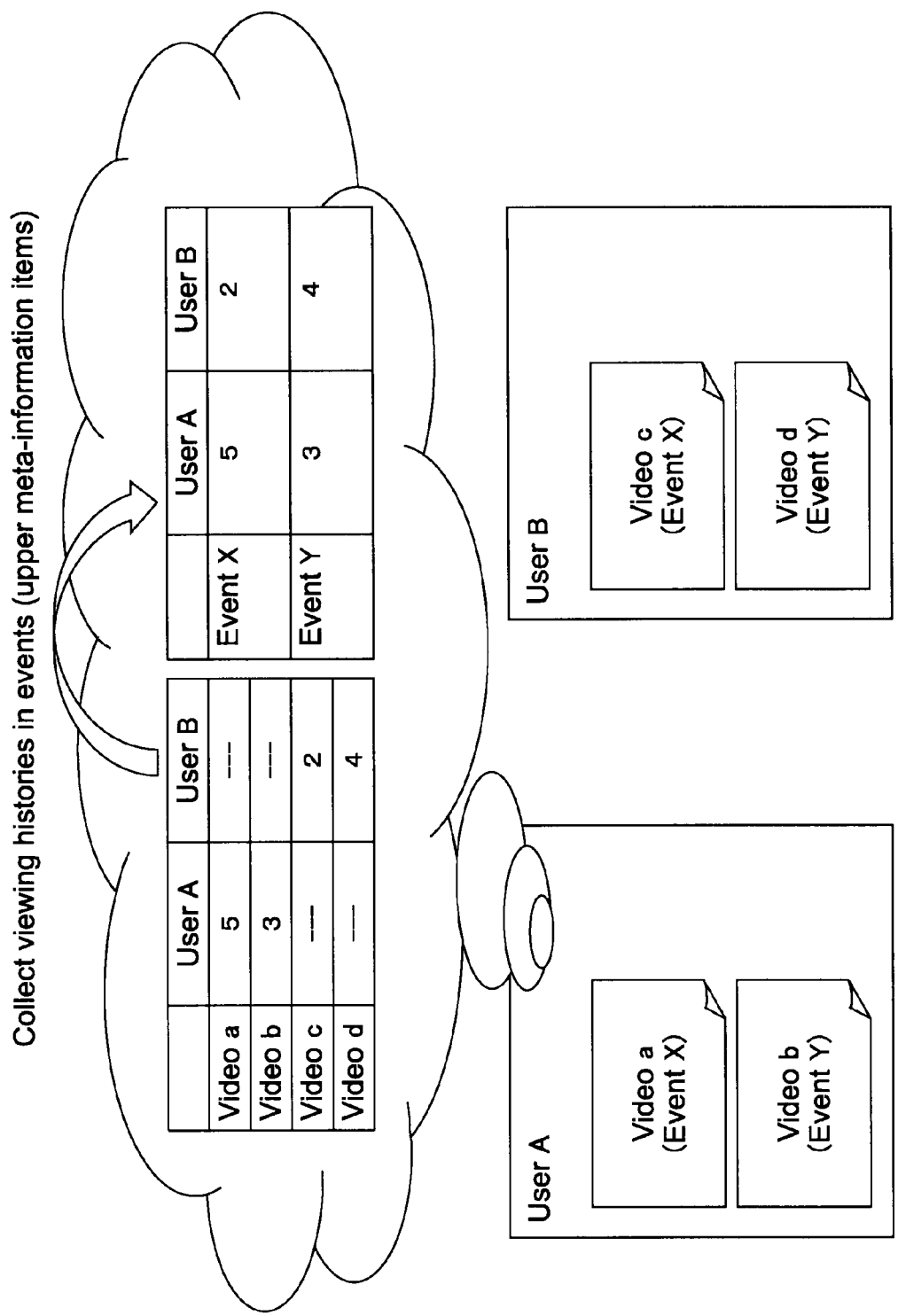
FIG. 13 is a view showing the outline of a process of collecting viewing histories by the method of FIG. 8.

Further, those objective meta-information items are used, and hence the method of collecting viewing histories using the Internet is also allowed. FIG. 13 is a view showing the outline of the process of collecting viewing histories. As shown in FIG. 13, the viewing histories of each user are accumulated for each of the upper meta-information items, and hence the viewing histories are sufficiently collected, and a recommendation with high accuracy is allowed.

MODIFICATION EXAMPLE

The present invention is not limited to the above-mentioned embodiments of the present invention, and various modifications thereof can be made without departing from the gist of the invention.

In the flow chart of FIG. 7, one rule is determined to be used, and a video group is determined according to the rule to be recommended. Further, in the flow chart of FIG. 12, all of the expanded meta-information items are used to determine a video group to be recommended. However, the PVR 100 may prepare a plurality of "rules" and "combinations of meta-information items to be used" as described above, and display them to be selected by a user.

With this, it is possible to perform a recommendation respecting intentions of viewers. For example, in a case where it is "on 10/10/2009, child X participates athletic meet at elementary school" that is input, in such a manner that recommendation results using only "child X" and "elementary school" as partial upper meta-information items are also provided, a viewer is allowed to flexibly select a video from them.

Figure 14:
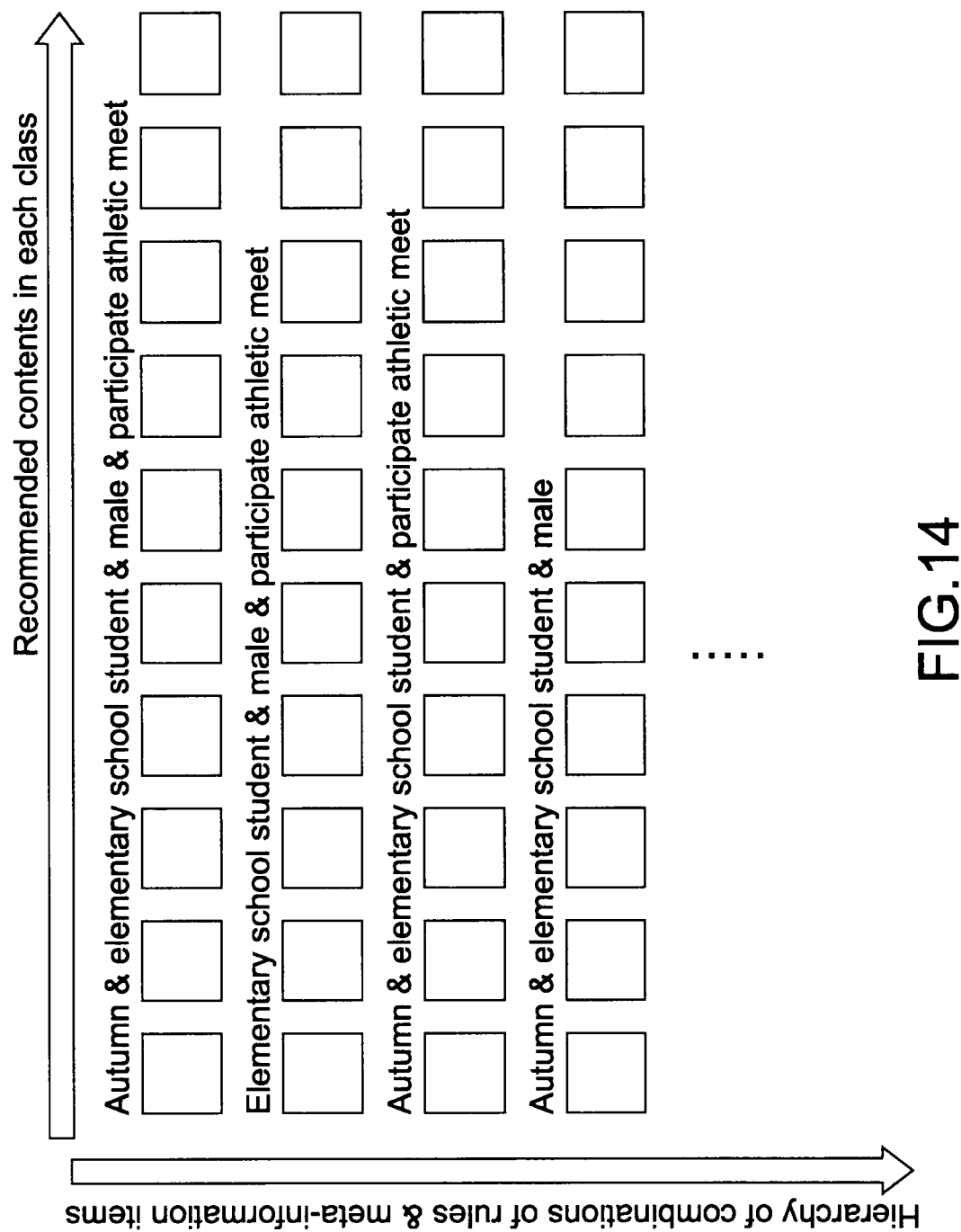
FIG. 14 is a view showing a display example of the list of recommended video contents in another embodiment of the present invention.

FIG. 14 is a view showing a display example of the list of recommended video contents displayed in this case. As shown in FIG. 14, the vertical axis indicates applied rules (combinations of meta-information items), and the horizontal axis indicates the list of video recommended by the rules (combinations of meta-information items).

In the vertical axis, the rules (combinations of meta-information items) are arranged in a recommendation degree of the rules (combinations of meta-information items) so that the most recommended "rule (combination of meta-information items)" is situated at an upper end. In the horizontal axis, the videos are arranged in a recommendation degree in each of the rules (combinations of meta-information items) so that the most recommended video is situated at a left end. In this manner, a video arranged at the upper left is most recommended video, and hence a viewer can access it more easily.

Now, the description will be made of the recommendation degree of "rules (combinations of meta-information items)" in the vertical axis also with reference to FIG. 9.

Assumed that an expansion example of the input upper meta-information item as described above with reference to FIG. 9. For the recommendation degree of the "rules (combinations of meta-information items)", the above-mentioned weightings are applied. In the tree structure of FIG. 9, while going toward the tips of branches, the meta-information items become lower meta-information items, that is, meta-information items included in more videos. Thus, while going toward the body of the tree structure, the meta-information items become meta-information items describing more specific features of the target video. The sum of weightings of the meta-information items becomes the recommendation degree in a "rule (combination of meta-information items)".

FIG. 15 is a table showing an example of combinations of meta-information items. In the example of FIG. 15, meta-information items expanded into lower meta-information items are replaced with meta-information items in expanded destinations, respectively. With this, combinations of meta-information items are determined so that duplicate meta-information items are included therein, and rules are searched by using each of the combinations. However, in a case where no rule is founded, the meta-information items thereof are not used and off course, the recommendation result thereof is also not displayed.

Figure 16:
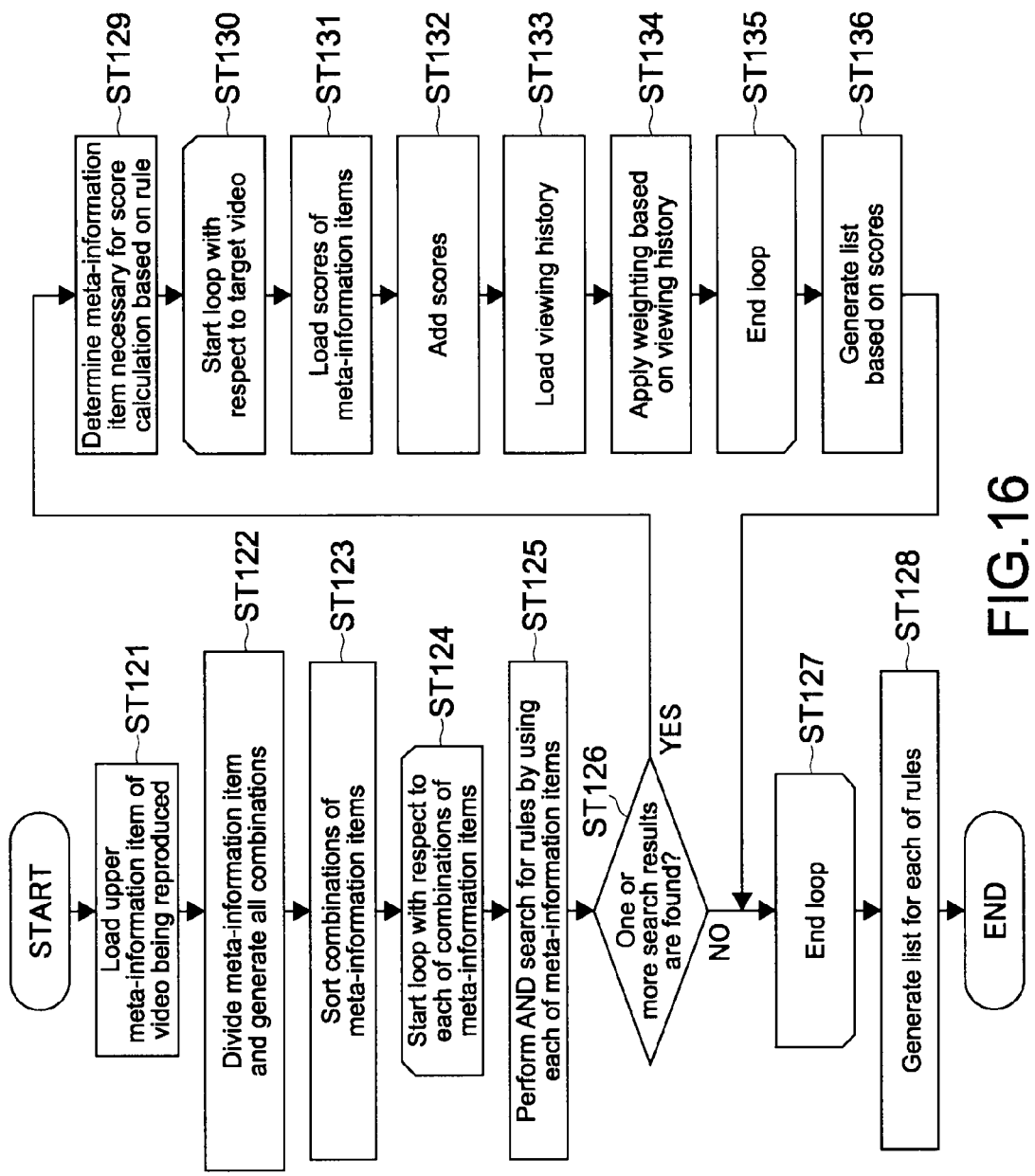
FIG. 16 is a flow chart showing a flow of a recommendation process in another embodiment of the present invention.

FIG. 16 is a flow chart showing a case where the above-mentioned processes are performed by the rule-based system. As shown in FIG. 16, the score-calculating unit 42 loads the upper meta-information item of the video being reproduced (Step 121), and then divides the meta-information items and generates all combinations (Step 122).

Then, the score-calculating unit 42 sorts the combinations of meta-information items (Step 123). After that, the score-calculating unit 42 executes a loop process of searching rules with respect to each of the combinations of meta-information items (Step 124 to 127).

The processes in the loop process are the same those described above with reference to FIG. 7 (Step 129 to 135).

Then, the score-calculating unit 42 generates the list of recommended video contents based on the scores calculated for each rule (Step 136), and outputs the list for each rule (Step 128).

In a case where the above-mentioned processes are executed with respect to the "collaborative filtering" system, the combinations of meta-information items without duplication as described above with reference to FIG. 15 can also be made. However, as shown in FIG. 17, the combinations including all of the meta-information items after expansion can also be made. That is because when the scores are calculated, the weightings are applied depending on the depth of expansion.

Figure 18:
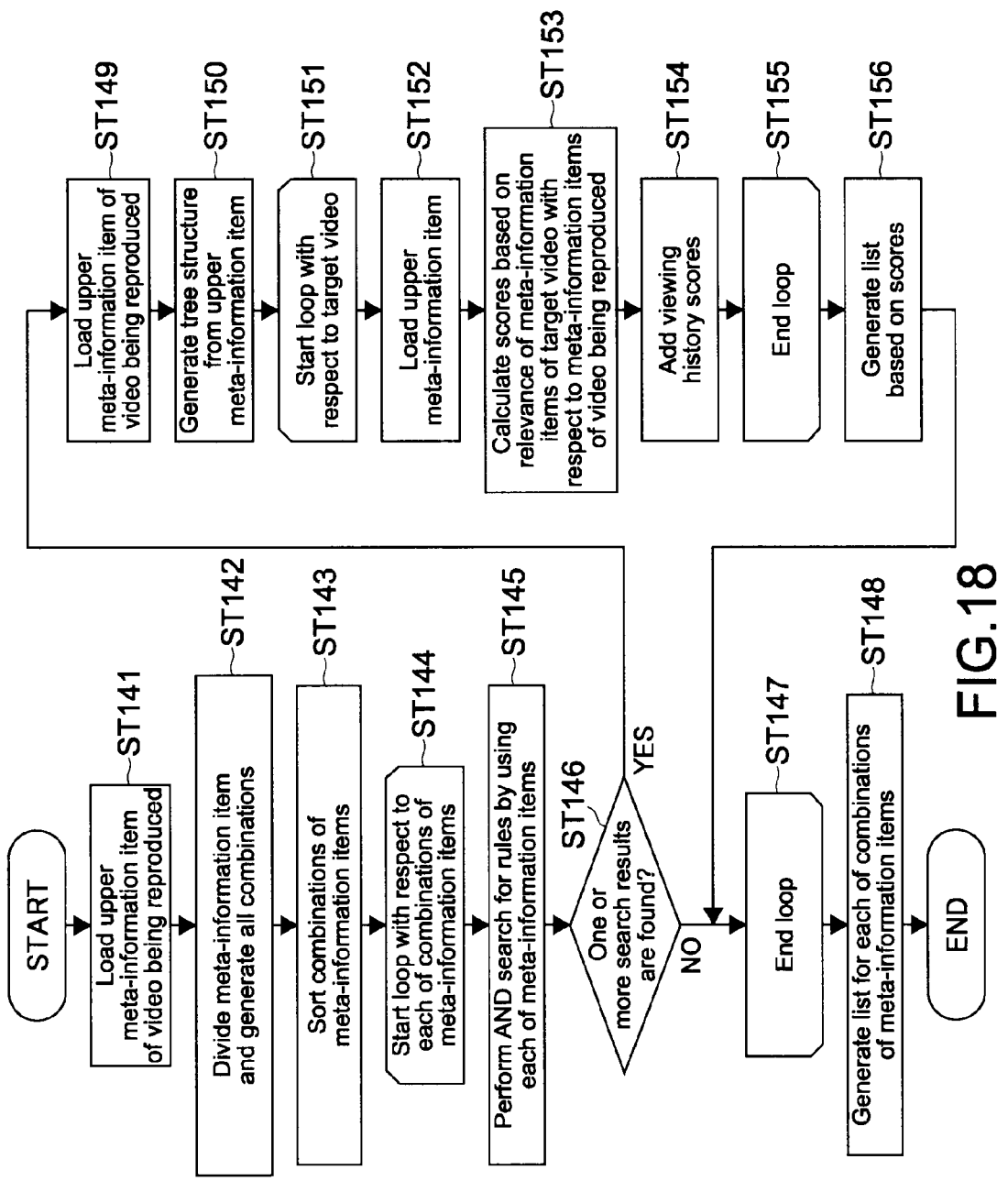
FIG. 18 is a flow chart showing a flow of a recommendation process in another embodiment of the present invention.

FIG. 18 is a flow chart showing a flow of a recommendation process with a plurality of combinations of meta-information items in the case of using the collaborative filtering system. In FIG. 18, Step 141 to Step 145 are the same as Step 121 to Step 125 of FIG. 16, and Step 149 to Step 155 are the same as Step 81 to Step 83 and Step 85 to Step 88 of the flow chart of the FIG. 12. Finally, the score-calculating unit 42 generates the list of recommended video contents based on the calculated scores for each of the combinations of meta-information items (Step 156), and outputs the list for each of the combinations (Step 48).

In each of the above-mentioned embodiments, the upper meta-information item is derived from the meta-information items extracted from each frame. However, in a case of a relatively long video including a plurality of scenes, the extraction of the upper meta-information items may be difficult. In view of this, the PVR 100 may detect scene changes with use of an objective feature such as a cut or a fade, and may divide the video into scenes before an event (upper meta-information item) of each scene is derived.

In each of the above-mentioned embodiments, any of the lower meta-information items and the upper meta-information items are extracted by the PVR 100. However, at least part of them may be extracted by another device, and may be input together with an image when the image is input into the PVR 100. For example, the lower meta-information items may be extracted by a digital video camera when shooting a video, and may be input into the PVR 100 together with the video data, and the PVR 100 may extract, from the lower meta-information items, an upper meta-information item. Further, for example, lower meta-information items which can be extracted with a relatively small operation amount, for example, in a case of face detection or night scene detection may be extracted by a digital video camera, and meta-information items with a relatively large operation amount necessary for extraction, for example, in a case of motion detection or general object recognition may be extracted by the PVR 100. In addition, in place of the PVR 100, the meta-information items may be extracted by a server on a network, and the extracted meta-information items may be input via the communication unit 11 into the PVR 100.

In addition, the processes executed by the PVR 100 in each of the above-mentioned embodiments and modification example may be executed by any of other electronic apparatuses including a television set, a personal computer (PC), a digital still camera, a digital video camera, a cellular phone, a smart phone, a recording/reproducing apparatus, a game machine, personal digital assistants (PDA), an electronic book terminal, an electronic dictionary, a portable AV device, and the like.

The present application contains subject matter related to that disclosed in Japanese Priority Patent Application JP 2010-084667 filed in the Japan Patent Office on Mar. 31, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus, comprising:
   a memory configured to store a plurality of video contents shot by a user and reproduction history information including a first history information item indicating the number of times of reproduction of the reproduced video content, and a second history information item identifying video content reproduced immediately after the reproduced video content; and
   a processor programmed to
   reproduce the plurality of stored video contents,
   analyze each of the plurality of video contents to extract a plurality of lower meta-information items, to analyze the plurality of extracted lower meta-information items to derive an upper meta-information item, and to calculate, based on the history information items, the plurality of lower meta-information items and an upper meta-information item of a first video content being reproduced and upper meta-information items of a plurality of second video contents having content different from the first video content among the plurality of video contents, a score for each of the plurality of second video contents by summing up the number of times of reproduction for each of the lower meta-information items of the plurality of second video contents including in part lower meta-information items matching with any of the lower meta-information items of the first video content, and
   output, according to the calculated score, a recommendation information item for recommending at least one of the plurality of second video contents after the reproduction of the first video content is stopped.

2. The electronic apparatus according to claim 1, wherein the memory stores a plurality of rule information items for calculating the score, the plurality of rule information items being different for each of the upper meta-information items, and
   the processor extracts, from the plurality of stored rule information items, one of the plurality of rule information items, which corresponds to the upper meta-information item of the first video content, and calculates the score as a matching degree with respect to the extracted rule information item.

3. The electronic apparatus according to claim 2, wherein the processor expands the upper meta-information item of the first video content into the plurality of lower meta-information items and extracts a rule information item matching all of the plurality of expanded lower meta-information items in a case where the rule information item corresponding to the upper meta-information item of the first video content is not extracted.

4. The electronic apparatus according to claim 1, wherein the reproduction history information items are associated with the upper meta-information item of the reproduced video content,
   the processor the score as a possibility with which each of the plurality of second video contents is reproduced immediately after the first video content, based on the upper meta-information item of the first video content and the stored reproduction history information item.

5. The electronic apparatus according to claim 1, wherein
the reproduction history information items are associated with the upper meta-information item of the reproduced video content, and
the processor expands each of the upper meta-information items of the first video content and the plurality of second video contents into the plurality of lower meta-information items.

6. The electronic apparatus according to claim 1, wherein
the upper meta-information item includes a plurality of components,
the processor divides the upper meta-information items into a plurality of partial upper meta-information items for each of the plurality of components, and calculates the score for each of plurality of combinations of the divided partial upper meta-information items, and
the processor outputs a recommendation information item for each of the combinations.

7. A content recommendation method, comprising:
storing a plurality of video contents shot by a user and reproduction history information including a first history information item indicating the number of times of reproduction of the reproduced video content, and a second history information item identifying video content reproduced immediately after the reproduced video content;
reproducing the plurality of stored video contents;
analyzing each of the plurality of video contents to extract a plurality of lower meta-information items;
analyzing the plurality of extracted lower meta-information items to derive an upper meta-information item;
calculating, via a processor and based on the history information items, the plurality of lower meta-information items and an upper meta-information item of a first video content being reproduced and upper meta-information items of a plurality of second video contents having content different from the first video content among the plurality of video contents, a score for each of the plurality of second video contents by summing up the number of times of reproduction for each of the lower meta-information items of the plurality of second video contents including in part lower meta-information items matching with any of the lower meta-information items of the first video content; and
outputting, according to the calculated score, a recommendation information item for recommending at least one of the plurality of second video contents after the reproduction of the first video content is stopped.

8. A non-transitory computer-readable medium containing computer-readable instructions thereon that when executed by a computer cause the computer to perform a method comprising:
storing a plurality of video contents shot by a user and reproduction history information including a first history information item indicating the number of times of reproduction of the reproduced video content, and a second history information item identifying video content reproduced immediately after the reproduced video content;
reproducing the plurality of stored video contents;
analyzing each of the plurality of video contents to extract a plurality of lower meta-information items;
analyzing the plurality of extracted lower meta-information items to derive an upper meta-information item;
calculating, based on the history information items, the plurality of lower meta-information items and an upper meta-information item of a first video content being reproduced and upper meta-information items of a plurality of second video contents having content different from the first video content among the plurality of video contents, a score for each of the plurality of second video contents by summing up the number of times of reproduction for each of the lower meta-information items of the plurality of second video contents including in part lower meta-information items matching with any of the lower meta-information items of the first video content; and
outputting, according to the calculated score, a recommendation information item for recommending at least one of the plurality of second video contents after the reproduction of the first video content is stopped.

9. The electronic apparatus according to claim 1, wherein the history information further includes a third history information item indicating how much of the video content has been reproduced.

10. The electronic apparatus according to claim 6, wherein the upper-meta-information items describe information contained within the first video content and second video contents.

11. The electronic apparatus according to claim 10, wherein the plurality of components of the upper meta-information item include information calculated based on information contained within the lower meta-information items and identifying who, what, when, where, why and how from the video contents.

12. The electronic apparatus according to claim 1, wherein the processor further calculates the score based on the number of occurrences of the upper meta-information item in the plurality of second video contents.

13. The electronic apparatus according to claim 12, wherein the processor further calculates the score based on the number of occurrences of each component of the upper meta-information item in the plurality of second video contents.

14. The electronic apparatus according to claim 9, wherein the processor weights the calculated score for each of the plurality of second video contents based on the number of times of reproduction of the reproduced video content, video content reproduced immediately after the reproduced video content, and information indicating how much of the video content has been reproduced.

15. The electronic apparatus according to claim 13, wherein the processor weights the calculated score for each of the plurality of second video contents based on the number of times of reproduction of the reproduced video content, video content reproduced immediately after the reproduced video content, and information indicating how much of the video content has been reproduced.

* * * * *